United States Patent
Butler et al.

(10) Patent No.: US 10,728,144 B2
(45) Date of Patent: Jul. 28, 2020

(54) ROUTING VIRTUAL AREA BASED COMMUNICATIONS

(71) Applicant: Sococo, Inc., Boston, MA (US)

(72) Inventors: Robert J. Butler, Kirkland, WA (US); Joseph Altmaier, North Liberty, IA (US); David Van Wie, Eugene, OR (US)

(73) Assignee: Sococo, Inc., Boston, MA (US)

(*) Notice: Subject to any disclaimer, the term of this patent is extended or adjusted under 35 U.S.C. 154(b) by 0 days.

(21) Appl. No.: 15/696,135

(22) Filed: Sep. 5, 2017

(65) Prior Publication Data

US 2017/0373969 A1    Dec. 28, 2017

Related U.S. Application Data

(60) Continuation of application No. 14/810,371, filed on Jul. 27, 2015, now Pat. No. 9,755,966, which is a (Continued)

(51) Int. Cl.
*H04L 12/741* (2013.01)
*H04L 29/06* (2006.01)
(Continued)

(52) U.S. Cl.
CPC .............. *H04L 45/54* (2013.01); *G06T 11/60* (2013.01); *G06T 13/40* (2013.01); *G06T 15/205* (2013.01);
(Continued)

(58) Field of Classification Search
CPC ... H04L 45/54; H04L 65/4069; H04L 65/605; G06T 17/05
(Continued)

(56) References Cited

U.S. PATENT DOCUMENTS 5,960,173 A    9/1999  Tang et al.
6,271,839 B1   8/2001  Mairs et al.
(Continued)

FOREIGN PATENT DOCUMENTS

WO    03015057 A1    2/2003

OTHER PUBLICATIONS

Chris Joslin et al., Collaborative Virtual Environments—From Birth to Standardization, IEEE Communications Magazine (vol. 42, Issue: 4, Apr. 2004.

*Primary Examiner* — Chris Parry
*Assistant Examiner* — Weiwei Y Stiltner
(74) *Attorney, Agent, or Firm* — Law Office of Edouard Garcia

(57) ABSTRACT

In association with a virtual area, a first network connection is established with a first network node present in the virtual area and a second network connection is established with a second network node present in the virtual area. Based on stream routing instructions, a stream router is created between the first network node and the second network node. The stream router includes a directed graph of processing elements operable to receive network data, process the received network data, and output the processed network data. On the first network connection, an input data stream derived from output data generated by the first network node is received in association with the virtual area. The input data stream is processed through the stream router to produce an output data stream. On the second network connection, the output data stream is sent to the second network node.

19 Claims, 16 Drawing Sheets

Related U.S. Application Data continuation of application No. 13/763,913, filed on Feb. 11, 2013, now abandoned, said application No. 14/810,371 is a continuation-in-part of application No. 14/722,156, filed on May 27, 2015, now Pat. No. 10,158,689, which is a continuation of application No. 14/045,562, filed on Oct. 3, 2013, now Pat. No. 9,055,131, which is a division of application No. 12/630,973, filed on Dec. 4, 2009, now Pat. No. 8,578,000, said application No. 14/810,371 is a continuation-in-part of application No. 14/251,505, filed on Apr. 11, 2014, now Pat. No. 9,411,490, which is a continuation of application No. 13/422,757, filed on Mar. 16, 2012, now Pat. No. 8,732,593, which is a continuation of application No. 12/418,243, filed on Apr. 3, 2009, now Pat. No. 8,191,001, said application No. 14/810,371 is a continuation-in-part of application No. 13/404,453, filed on Feb. 24, 2012, now Pat. No. 9,762,641, which is a continuation of application No. 12/818,517, filed on Jun. 18, 2010, now Pat. No. 8,578,044, which is a continuation of application No. 11/923,629, filed on Oct. 24, 2007, now Pat. No. 7,769,806.

(60) Provisional application No. 61/597,757, filed on Feb. 11, 2012, provisional application No. 61/120,372, filed on Dec. 5, 2008, provisional application No. 61/042,714, filed on Apr. 5, 2008.

(51) Int. Cl.
  *G06T 15/20* (2011.01)
  *G06T 11/60* (2006.01)
  *G06T 17/05* (2011.01)
  *G06T 19/00* (2011.01)
  *G06T 13/40* (2011.01)
  *G06T 19/20* (2011.01)

(52) U.S. Cl.
  CPC ............ *G06T 17/05* (2013.01); *G06T 19/006* (2013.01); *G06T 19/20* (2013.01); *H04L 65/4069* (2013.01); *H04L 65/605* (2013.01); *H04L 67/38* (2013.01); *G06T 2200/04* (2013.01); *G06T 2207/10012* (2013.01); *G06T 2207/10016* (2013.01); *G06T 2207/10072* (2013.01); *G06T 2207/30196* (2013.01); *G06T 2215/16* (2013.01); *G06T 2219/024* (2013.01); *G06T 2219/2004* (2013.01)

(58) Field of Classification Search
  USPC ........................................................ 709/219
  See application file for complete search history.

(56) References Cited

U.S. PATENT DOCUMENTS

| | | | |
|---|---|---|---|
| 7,124,164 B1 | 10/2006 | Chemtob | |
| 7,240,093 B1 | 7/2007 | Danieli et al. | |
| 7,948,977 B2 | 5/2011 | Bennett | |
| 8,176,186 B2 | 5/2012 | McCanne et al. | |
| 8,199,761 B2 | 6/2012 | Barraclough et al. | |
| 8,397,168 B2 | 3/2013 | Leacock et al. | |
| 8,402,085 B2 | 3/2013 | McCanne et al. | |
| 8,705,527 B1 | 4/2014 | Addepalli et al. | |
| 8,869,027 B2 | 10/2014 | Louch et al. | |
| 2004/0061773 A1 | 4/2004 | Liu | |
| 2004/0128350 A1 | 7/2004 | Topfl et al. | |
| 2005/0021804 A1* | 1/2005 | Hameleers | H04N 21/2662 709/231 |
| 2005/0149877 A1 | 7/2005 | Rice et al. | |
| 2007/0198726 A1 | 8/2007 | Marco et al. | |
| 2007/0233785 A1 | 10/2007 | Abraham et al. | |
| 2007/0258468 A1 | 11/2007 | Bennett | |
| 2007/0291706 A1 | 12/2007 | Miller et al. | |
| 2008/0049622 A1* | 2/2008 | Previdi | H04L 41/0668 370/237 |
| 2008/0098121 A1 | 4/2008 | Wu | |
| 2008/0263458 A1 | 10/2008 | Altberg et al. | |
| 2009/0113066 A1 | 4/2009 | Wie et al. | |
| 2010/0246587 A1* | 9/2010 | Schutz | H04L 45/00 370/401 |
| 2010/0257450 A1 | 10/2010 | Go et al. | |
| 2010/0299433 A1 | 11/2010 | Boer et al. | |
| 2011/0099218 A1 | 4/2011 | Schwartz | |
| 2012/0163224 A1* | 6/2012 | Long | H04L 41/5025 370/252 |
| 2012/0209933 A1 | 8/2012 | Ridges et al. | |
| 2013/0124712 A1* | 5/2013 | Parker | H04L 41/5038 709/224 |
| 2014/0289381 A1* | 9/2014 | Morton | H04L 41/5025 709/221 |
| 2014/0297811 A1* | 10/2014 | Stevens | H04L 65/60 709/219 |
| 2015/0026303 A1* | 1/2015 | Olsen | H04L 47/724 709/219 |
| 2015/0029865 A1* | 1/2015 | Drobinsky | H04L 47/12 370/238 |
| 2016/0234073 A1* | 8/2016 | Maes | H04L 41/12 |
| 2017/0024259 A1* | 1/2017 | Mecklin | G06F 9/5044 |

* cited by examiner

ROUTING VIRTUAL AREA BASED COMMUNICATIONS

CROSS-REFERENCE TO RELATED APPLICATIONS

Under 35 U.S.C. § 119(e), this application claims the benefit of U.S. Provisional Application No. 61/597,757, filed Feb. 11, 2012, the entirety of which is incorporated herein by reference.

This application also relates to the following co-pending patent applications, the entirety of each of which is incorporated herein by reference: U.S. patent application Ser. No. 12/818,517, filed Jun. 18, 2010; U.S. patent application Ser. No. 12/855,210, filed Aug. 12, 2010; U.S. patent application Ser. No. 12/630,973, filed Dec. 4, 2009; U.S. patent application Ser. No. 12/631,008, filed Dec. 4, 2009; U.S. patent application Ser. No. 12/825,512, filed Jun. 29, 2010; U.S. patent application Ser. No. 13/209,812, filed Aug. 15, 2011; U.S. patent application Ser. No. 13/604,360, filed Sep. 5, 2012; U.S. patent application Ser. No. 13/604,400, filed Sep. 5, 2012; and U.S. Provisional patent application Ser. No. 13/680,463, filed Nov. 19, 2012.

BACKGROUND

When face-to-face communications are not practical, people often rely on one or more technological solutions to meet their communications needs. Traditional Telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
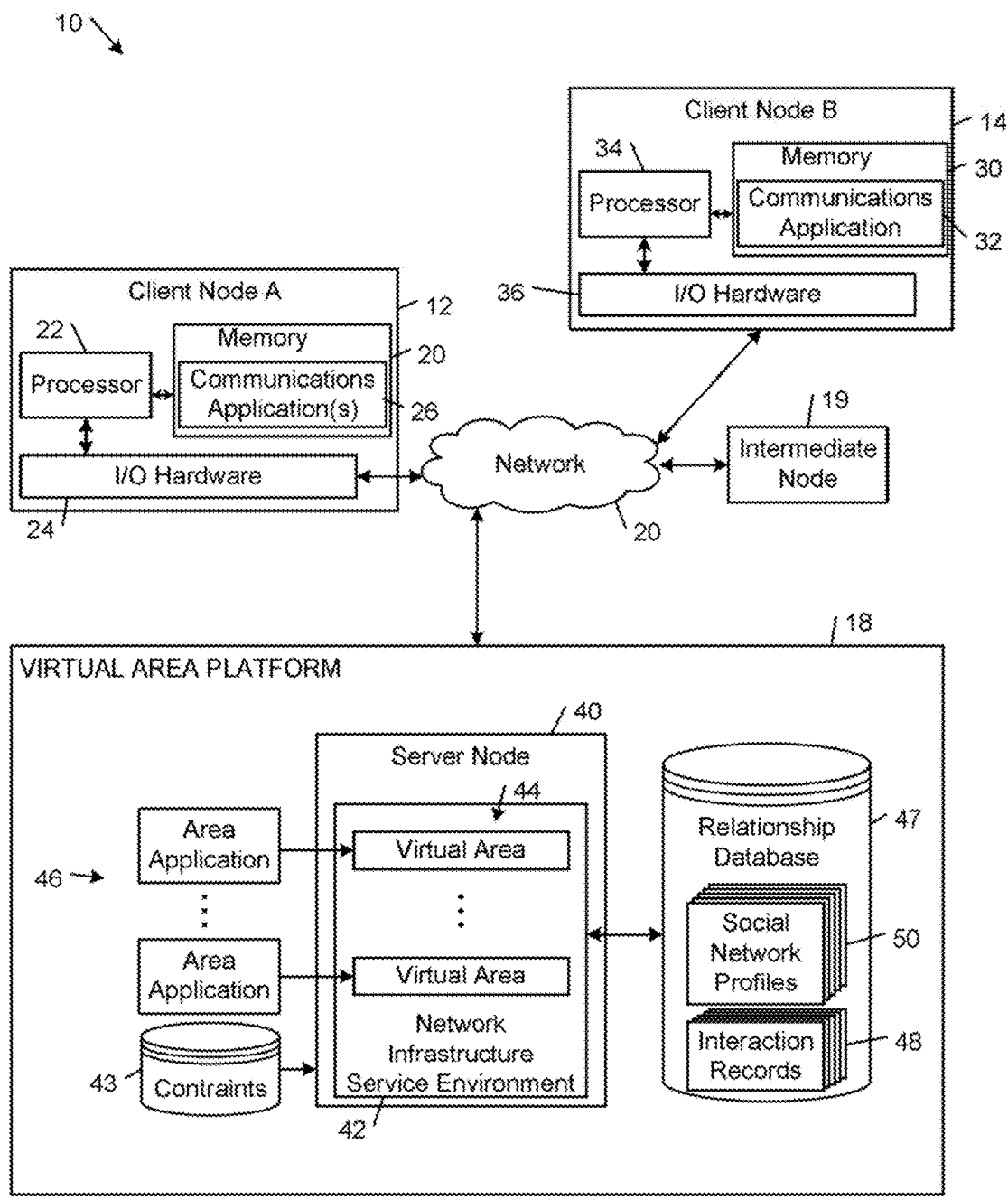
FIG. 1 is a diagrammatic view of an example of a network communications environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "data sink" (referred to herein as a "sink") is any of a device (e.g., a computer), part of a device, or software that receives data.

A "data source" (referred to herein as a "source") is any of a device (e.g., a computer), part of a device, or software that originates data.

A "network node" (also referred to herein as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

Synchronous conferencing refers to communications in which communicants participate at the same time. Synchronous conferencing encompasses all types of networked collaboration technologies, including instant messaging (e.g., text chat), audio conferencing, video conferencing, file sharing, and file sharing technologies.

A "communicant interaction" is any type of direct or indirect action or influence between a communicant and another network entity, which may include for example another communicant, a virtual area, or a network service. Examples of types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area" or a "place") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual area communications application" is a client communications application that integrates realtime audio communications (and potentially other realtime communications, e.g., video, chat, and realtime other data stream) with visual presentations of interactions in a virtual area.

A "virtual environment" is a representation of a computer-managed space that includes at least one virtual area and supports realtime communications between communicants.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "predicate" is a conditional part of a rule. A "topology switching predicate" is a predicate that conditions the switching from one network topology to another network topology on satisfaction of one or more criteria.

As used herein, the term "includes" means includes but not limited to, the term "including" means including but not limited to. The term "based on" means based at least in part on.

II. Routing Virtual Area Based Communications

FIG. 1 shows an example of a network communications environment 10 that includes a first client network node 12 (Client Node A), a second client network node 14 (Client Network Node B), a virtual area platform 18, and an intermediate network node 19 that are interconnected by a network 20. The network 20 may include one or more of any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 26 (including a display). The processor 24 executes at least one virtual area communications application 26 that is stored in the memory 22. The second client network node 14 typically is configured in substantially the same general way as the first client network node 12, with a computer-readable medium 30 storing at least one virtual area communications application 32, a processor 34, and input/output (I/O) hardware 36 (including a display). In some examples, the virtual area platform 18 includes one or more web servers running web-based client applications that enable web browser applications (e.g., Google Chrome™, Apple Safari®, Mozilla Firefox®, and Internet Explorer® web browser applications) on client network nodes to access the functionality of the client applications 26, 32.

Each of the client network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized realtime data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering realtime data streams different from those already described, or software that processes realtime streams for analysis or customized display). Each source has an active state in which the source is available for originating data and an inactive state in which the source is not available for originating data. Likewise, each sink has an active state in which the sink is available for receiving data and an inactive state in which the sink is not available for receiving data. The communicants operating the client nodes 12, 14 typically can control the states of the sources and sinks using controls provided by the communications applications 26, 32. For example, the communications applications 26, 32 typically provide user controls for turning on/off the local microphones and the local speakers (e.g., headsets) on the client network nodes 12, 14.

The intermediate network node 19 may be any type of computing device capable of routing data between network nodes. Examples of the types of computing devices that may serve as the intermediate network node 19 include a server network node, a client network node, and a network switch, which includes network switches, network routers, and network hubs.

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record 48 describes the context of an interaction between a pair of communicants. For example, in some examples, an interaction record 48 contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the network infrastructure service environment 42 tracks when it occurred, where it occurred, and what happened during the interaction in terms of communicants involved (e.g., entering and exiting), objects that are activated/deactivated, and the files that were shared. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

The communications applications 26, 32, the area applications 46, and the network infrastructure service environment 42 together provide a platform that administers the realtime connections between network nodes in an instance of a virtual area subject to a set of constraints 43 (e.g., capabilities and other types of permissions, rules, and preferences). Each of the virtual area applications 46 is hosted by a respective one of the virtual areas 44 and includes a description of the respective virtual area 44. Communicants respectively operating the client nodes 12, 14 connect to the virtual areas 44 through the virtual area communications applications 26, 32.

In some examples, the server node 40 communicates with the client nodes 12, 14 and the intermediate node 19 in accordance with the stream transport protocol described in U.S. patent application Ser. No. 12/825,512, filed Jun. 29, 2010, and U.S. patent application Ser. No. 12/630,973, filed Dec. 4, 2009. The stream transport protocol supports remote management of client communication sessions and remote configuration and execution of audio and graphic rendering engines, as well as switching of data streams in response to instructions (also referred to as definitions) that are received from a remotely hosted virtual area application. The stream transport protocol is efficient in connection and disconnection, as well as in transport. In some examples, the stream transport protocol provides a connection-oriented, encrypted connection over a transport protocol (e.g., UDP, TCP, HTTP, and PPP). The stream transport protocol additionally provides between a client application and the transport layer a reconnection mechanism that automatically attempts to reestablish failed connections without intervention by the client application, thereby adding reliability on top of an inherently unreliable communication protocol.

Figure 2:
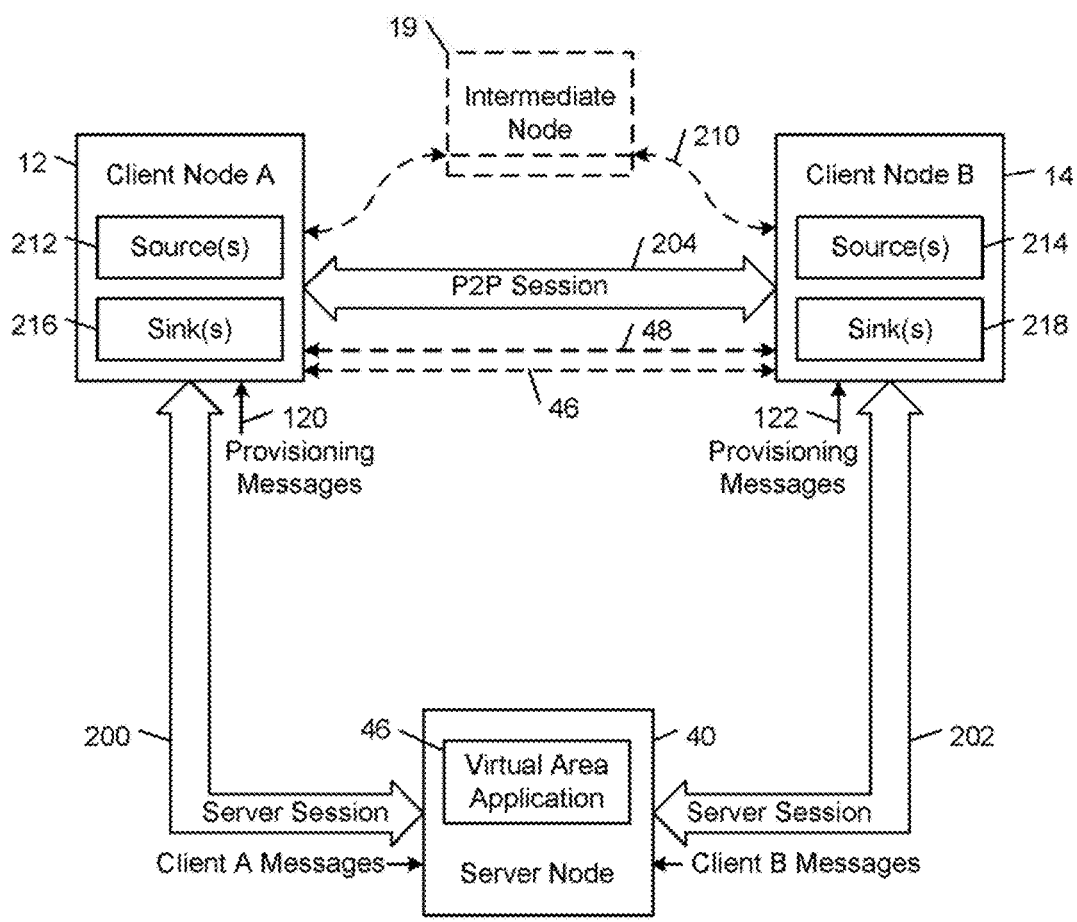
FIG. 2 is a diagrammatic view of an example of the network communications environment of FIG. 1 that shows an exemplary set of network connections and sessions between the network nodes.

FIG. 2 shows an exemplary set of sessions that may be established between the client nodes 12, 14 and the server node 40. In this example, the client nodes 12, 14 establish respective server sessions 200, 202 with the server node 40. Each of the server sessions 200, 202 is established over a respective network connection between a respective one of the client nodes 12, 14 and the server node 40. In addition, each of the client nodes 12, 14 also establishes a peer-to-peer (P2P) session 204 over a network connection between the client nodes 12, 14. The client nodes 12, 14 also may establish and keep alive one or more alternate (or backup) connections 206, 208, 210 that may be used as failover connections for reestablishing a P2P session between the client nodes 12, 14 in the event that the original P2P session fails. In the illustrated example, the alternate network connection 210 is established through the intermediate node 19, which relays messages (including session negotiation messages) between the client nodes 12, 14.

In the server sessions 200, 202, the server node 40 sends to each of the client nodes 12, 14 provisioning messages 120, 122 that configure the client nodes 12, 14 to interconnect respective data streams between active ones of their complementary sources and sinks in accordance with switching rules specified in the virtual area application 46.

Sessions between the network nodes can be established over any type of serial communications protocol stream (e.g., UDP, TCP, HTTP, and PPP). In some examples, a stream is a bi-directional UDP socket between two network nodes defined by two IP address/port pairs, and a transport GUID (Globally Unique Identifier). A stream supports sessions of channels. A session is a logical node-to-node connection. Sessions transport channels for the two nodes. Sessions may pass through one or more proxy nodes and are transported over streams that may contain multiple sessions.

In some examples, the network nodes include a stream transport service that manages sessions, as described in U.S. patent application Ser. No. 12/825,512, filed Jun. 29, 2010, and U.S. patent application Ser. No. 12/630,973, filed Dec. 4, 2009. In some examples, the stream transport protocol records are STRAW (Sococo TRAnsport for WAN) packets, as described in and U.S. patent application Ser. No. 12/630,973, filed Dec. 4, 2009. A STRAW packet starts with a STRAW Record, which has a 128-bit Channel ID (which is a GUID), a 16-bit Flag field, an 8-bit version field, an 8-bit key field, a 64-bit cookie field, a 32-bit MAC field, a 16-bit Packet Number, an 8-bit Extension Type field, an 8-bit Extension Length field, and an optional Extension Protocol field. The KEY field identifies the cipher used to encrypt the message (0 means not encrypted). The Packet Number starts at zero and increments with each packet in the stream. When the Packet Number reaches 65535, it returns to zero and keeps counting. The packet number and Flags are in "Big-Endian" order. Following the STRAW Record is the data packet that contains SODA (Sococo Definition Architecture) records. A SODA record contains one or more SODA definitions. Examples of SODA definitions session maintenance definitions (e.g., keepalive/acknowledgement definition records), client provisioning definitions (e.g., definitions of processing graph elements, such as audio processing elements), definitions of rendering assets (e.g., texture and mesh), and definitions of RDS (e.g., avatar motion checkpoints).

Sessions are divided logically into channels that are identified by the identifier contained in the first field (i.e., the Channel ID field) of a STRAW Record. Exemplary types of channels include session channels, station channels, and media channels (also referred to herein as "content" channels). Session channels are identified by the presence of a session identifier in the Channel ID field of STRAW Records and are designated for carrying data (e.g., StreamStats, Pings, and Keepalive messages) relating to session management tasks. Station channels are identified by the presence of a station identifier in the Channel ID field of the STRAW Record and are designated for carrying data relating to network address resolution tasks. Media channels are identified by the presence of a content identifier in the Channel ID field of the STRAW Record and are designated for carrying media data (e.g., audio data, video data, chat data, and screen share data).

In some examples, the network nodes share data in accordance with a publish/subscribe model, as described in U.S. patent application Ser. No. 12/630,973, filed Dec. 4, 2009. In these examples, the client nodes 12, 14 subscribe to only the data they need. The server node 16 determines what channels are needed by each of the client nodes 12, 14 based on the respective states (i.e., active or inactive) of their sources and sinks. The virtual area platform sends to each of the client nodes 12, 14 respective publish messages indicating what information streams are available for that client, tagging each stream with a GUID handle. Each of the client processes operating on each client node may subscribe to zero or more of the channels. A client process that subscribes to a channel registers with the local stream transport service to receive notification of channel state changes and channel records as they arrive. Each of the client nodes then subscribes to the desired channels from the other client nodes using well-known channel GUIDs that are specified by the virtual area application 46. Any changes to server data for a particular channel will be sent as definition records to all the clients that have subscribed to that channel.

Figure 3:
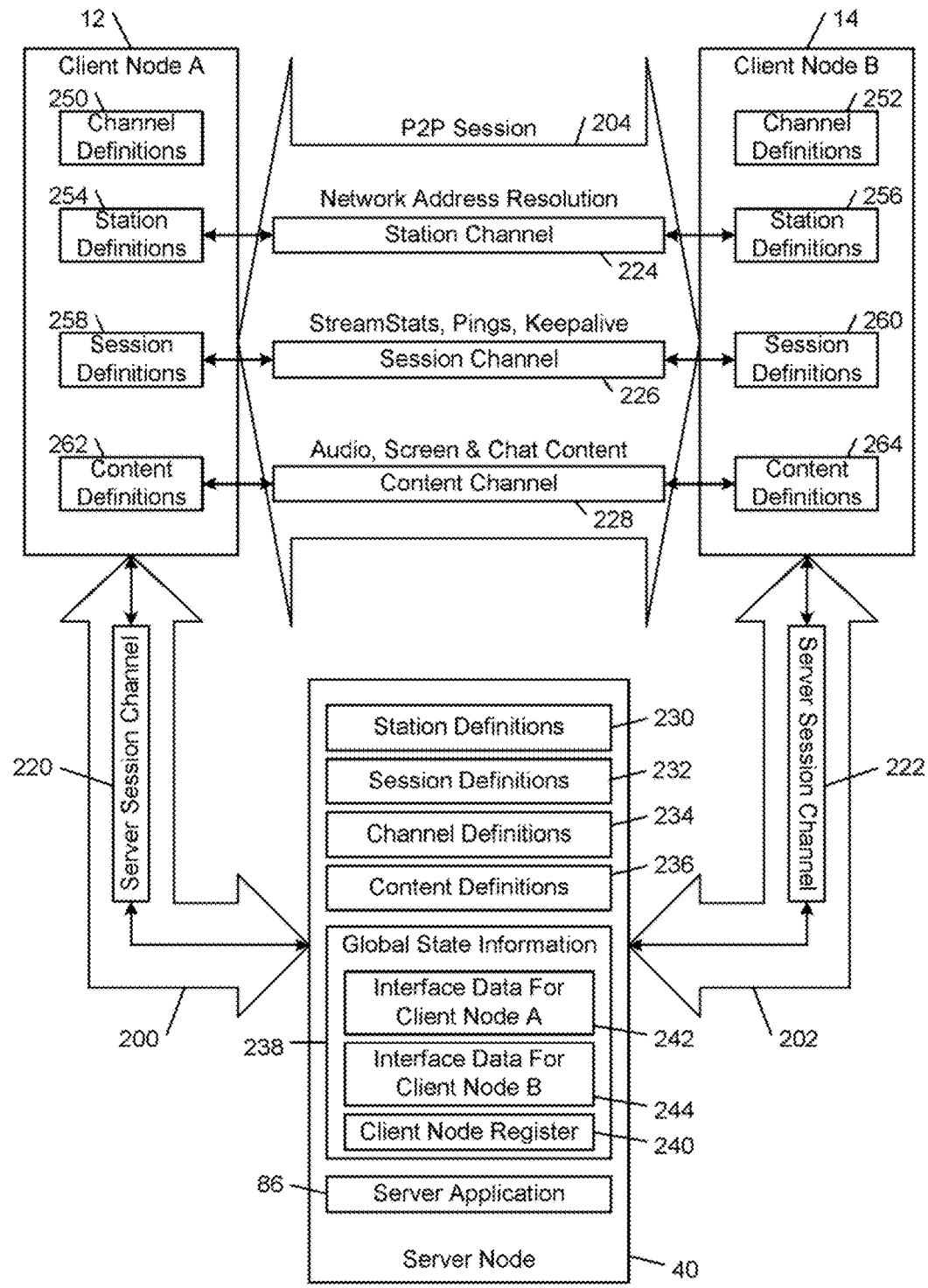
FIG. 3 is a diagrammatic view of an example of the network communication environment of FIG. 1 in which client and server network nodes communicate on various channels in the respective sessions that are established between the network nodes.

FIG. 3 shows an example of the network communications environment 10 in which the client and server network nodes 12-16 communicate on various channels in the respective sessions 200-204 that are established between the network nodes 12-16. The server node 40 communicates with each of the client nodes 12, 14 on a respective server session channel 220, 222 in the server sessions 200, 202, and the client nodes 12, 14 communicate with each other on a station channel 224, a session channel 226, and a content channel 228 in the peer-to-peer session 204. In some examples, data is shared between respective nodes in a session as definition records over STRAW sockets in accordance with a publish/subscribe model, as described in U.S. patent application Ser. No. 12/825,512, filed Jun. 29, 2010. The instances of the stream transport service operating on the client nodes 12, 14 subscribe only to the data that are needed by the client network nodes. To subscribe, a stream transport service instance creates a STRAW channel to a target network node by negotiating a particular Channel ID, which is a well-known GUID in the namespace defined for the virtual area application 46.

The server node 40 maintains data for provisioning the client nodes 12, 14 to communicate in accordance with the virtual area application 46. Among the types of data that the server node 40 maintains are station definitions 230, session definitions 232, channel definitions 234, and content definitions 236. The server node 40 also maintains global state information 238 that includes a current register 240 of the client nodes that are connected to the server application and interface data 242, 244 that identifies the data sources and sinks of the client nodes and the respective states of the sources and sinks (i.e., active or inactive).

The server network node creates a globally unique Channel ID per content type for each pair of currently active complementary sources and sinks between session partners (e.g., an audio channel from node 1 to node 2 and an audio channel from node 2 to node 1). Therefore, each of the currently available channels is identified by a respective Channel ID that is unique to the current conversation between the client network nodes and messages sent with that Channel ID can be trusted as being authentic and from the session partner. For example, in response to receipt of a message from the a first session partner to turn off its local microphone, the server node 40 instructs the second session partner to tear down its microphone audio channel processing graph, which removes the associated subscribe to the original audio channel; and in response to a message from the first session partner to turn back on the local microphone, the server node 40 creates a new audio channel with a new unique Channel ID and instructs the second session partner to subscribe to the new audio channel and to create a new microphone audio processing graph for processing the microphone data on the new audio channel. The second session partner will ignore any packets that are received on the original audio channel after receipt of the instruction to tear down the original microphone audio channel processing graph.

The server node 40 provisions each of the client nodes 12, 14 for communicating in accordance with the virtual area application 46 by sending definition records over the respective server session channel 220, 222. In this process, the server node 40 sends publish messages indicating the channels that are available to the client nodes 12, 14, tagging each with a GUID handle. The instances of the stream transport service operating on the client nodes 12, 14 send subscribe messages for the desired data streams to the server node 40. Any changes to the provisioning data for the subscribed channels are sent as definition records to all client network nodes that have subscribed to those channels.

Over each of the server sessions, the server network node 40 transports control messages of different content types on different respective channels that logically divide the control messages by content type. Each of the control messages typically is sent with a unique server session identifier that is assigned to the server session. The content type of a control message is determined from the channel ID. In some examples, the server network node transmits to each of the client network nodes connected to the server application the respective unique station identifiers that are assigned to the other client network nodes. In some of these examples the server network node also transmits a station definition of an intermediate node 19 to each of the client network nodes connected to the server application. The station definition of the intermediate node 19 typically includes the respective station identifier assigned to the intermediate node 19 and one or more entries each of which includes a respective network address and a respective protocol port identifier for a protocol port on the intermediate node 19.

In response to receipt of the definition records from the server node 40, the respective instances of the stream transport service operating on the client nodes 12, 14 update locally stored tables containing channel definitions 250, 252, station definitions 254, 256, session definitions 258, 260, and content definitions 262, 264. These definitions are used by the instances of the stream transport service to determine whether or not to process incoming data packets and to determine how the incoming packets should be demultiplexed for consumption by the stream transport service and the other client processes.

The communications applications 26, 32 typically present respective views of the virtual areas 44 in accordance with data received from the network infrastructure service environment 42. The communications applications 26, 32 also provide respective interfaces for receiving commands from the communicants and providing an interface that enhances the realtime communications between the communicants. The communicants typically are represented in the virtual areas 44 by respective avatars (e.g., sprites), which typically move about the virtual areas 44 in response to commands that are input by the communicants at their respective network nodes. In some examples, the communications applications 26, 32 establish realtime data stream connections between the first and second client network nodes 12, 14 and other network nodes connected to the virtual area 44 based on the positions of the communicants' avatars in the virtual areas 44. In some examples, each of the client network nodes 12, 14 includes a respective realtime kernel of the type described in U.S. patent application Ser. No. 12/630,973, filed Dec. 4, 2009, which supports remote configuration of stream handlers for processing data streams (e.g., rendering audio and video data streams) on a client network node.

A virtual area 44 may correspond to an abstract (non-geometric) virtual area that is defined with respect to abstract coordinates, or a visual virtual area that is defined with respect to one-, two- or three-dimensional geometric coordinates. Abstract virtual areas may or may not be associated with respective visualizations, whereas visual virtual areas are associated with respective visualizations.

In some of the examples that are described herein, the virtual areas are visual virtual areas of the type disclosed in U.S. Pat. Nos. 7,769,806 and 7,844,724. These visual virtual areas include physical geometry and collision geometry. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be painted onto the visual geometry and the texture, color, or intensity near the lighting effects may be modified. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

Some examples of the virtual area platform enable software application designers to define the semantics of position in an abstract virtual area (e.g., a software application or a computer data file). Through associations with respective connection rules, these position definitions can be used, for example, to drive connections to virtual areas, entries into virtual areas, connections to communicants and other sources or sinks of realtime data streams, and determinations of presence data relating to communicants, network resources, and network services. Additional details regarding systems and methods of defining the semantics of position in abstract virtual areas are described in U.S. application Ser. No. 12/631,008, which was filed on Dec. 4, 2009.

A virtual area typically includes one or more zones. A zone may be a rendered spatial extent, a set of rules applied to a spatial extent, or both. Zones may be arranged hierarchically in a virtual area, with an outermost zone (referred to herein as the "Global Governance Zone") enclosing all other zones in the virtual area. Within the Global Governance Zone, there can be location zones (e.g., rooms of a virtual area) or smaller governance zones that enclose a group of location zones and provide regions of governance on the map. A zone definition typically also includes one or more channel definitions that describe how to create respective channels in the zone and specify the information about the channel that is published to a client network node that becomes present in the zone. A channel is always uniquely defined point-to-point and is unique to a session and a virtual area application.

Examples of the types of rules that may be associated with a zone include switching rules, governance rules, and permission rules.

Switching rules govern realtime stream connections between network nodes that are linked to the virtual area (e.g., network nodes that are associated with objects, such as avatars, in the virtual area). The switching rules typically include a description of conditions for connecting sources and sinks of realtime data streams in terms of positions in the virtual area. Each switching rule typically includes attributes that define the realtime data stream type to which the rule applies and the location or locations in the virtual area where the rule applies. In some examples, each of the rules optionally may include one or more attributes that specify a required role of the source, a required role of the sink, a priority level of the stream, and a requested data routing topology. In some examples, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area. The network connections between network nodes may be arranged in a variety of different data routing topologies, including a peer-to-peer topology, a mediated topology (i.e., a topology in which connections between network nodes are mediated by another network node, such as a server network node, a client network node, or a network switch), and hybrid architectures that combine aspects of peer-to-peer and mediated architectures. In some examples, the switching rules dictate how local connection processes executing on each of the network nodes establishes communications with the other network nodes based on the locations of the associated objects in the zones of the virtual area. A switching rule also may define a direct connection between network nodes or an indirect connection through an intermediate network node (e.g., the intermediate node 19; see FIG. 1).

Governance rules control who has access to resources (e.g., the virtual area itself, regions with the virtual area, and objects within the virtual area), who has access to data (e.g., data streams and other content) that is associated with the virtual area, what is the scope of that access to the data associated the virtual area (e.g., what can a user do with the data), and what are the follow-on consequences of accessing that data (e.g., record keeping, such as audit logs, and payment requirements). In some examples, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

A permission rule defines a respective capability requirement (e.g., for a respective action, behavior, or state) in terms of one or more capabilities, attributes, and settings, which may be persistent or transient. Examples of permission rules include: a rule that conditions a communicant's ability to enter a target zone on the communicant having a CanEnterZone capability for the target zone; a rule that conditions the ability of a grantee communicant to open a target door of a target room on the grantee communicant having a CanOpenDoor capability for the target room; and a rule that conditions the transmission of a message describing the state of a particular communicant's avatar in a zone to a recipient having a CanSeeState capability for the particular communicant in the zone. A capability provides permission for a client to perform some action within the application. For example, a client may be granted the capability "CanEnterZone" for a specific zone within a virtual area that has been defined with that capability requirement. The client that has the capability can enter the zone, whereas a client without the capability would have their RDS state change rejected when they tried to enter the zone. Examples of capabilities systems for administering permission rules are described in U.S. Provisional Patent Application No. 61/535,910, filed Sep. 16, 2011.

The virtual area platform 18 enables a wide variety of highly customizable virtual area applications to be created. Examples of such applications include virtual area applications for creating a virtual office, a virtual personal space, a virtual art gallery, a virtual concert hall, a virtual auditorium, a virtual conference room, and a virtual club house.

Figure 4:
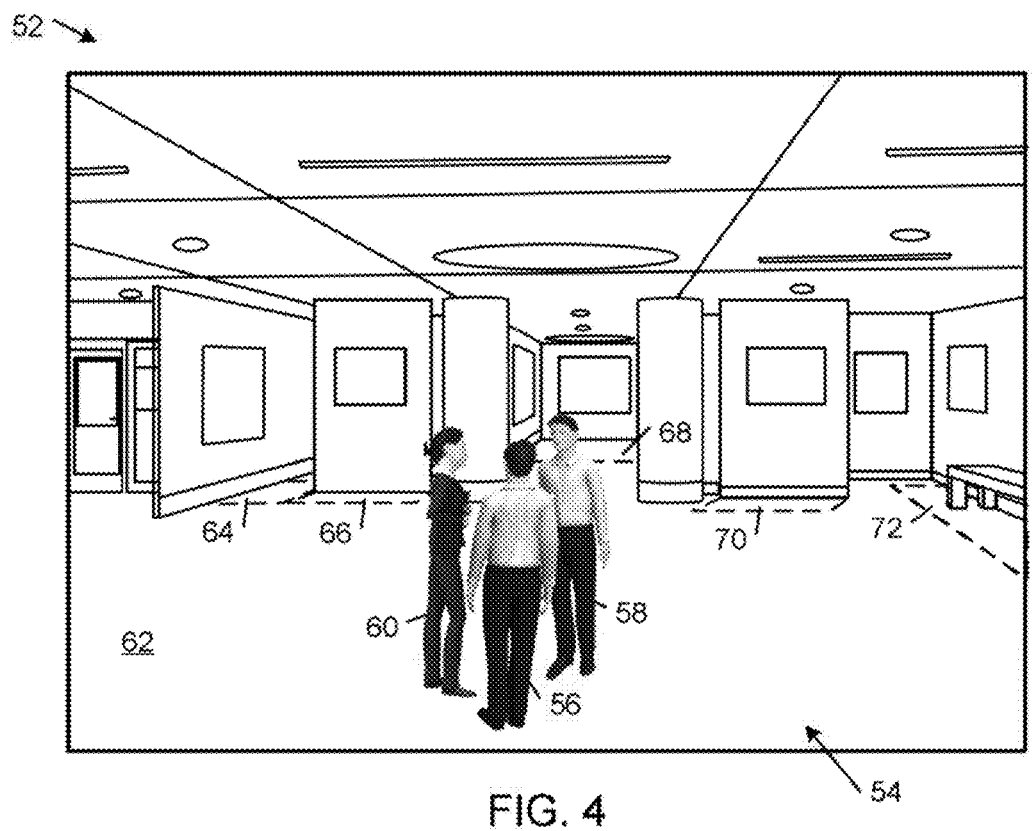
FIG. 4 is a diagrammatic view of an example of a graphical user interface showing a perspective view of a virtual area.

FIG. 4 shows an example of a graphical user interface 52 that presents a two-dimensional view of a visual virtual art gallery area 54. Communicants are represented in the virtual area 54 by respective avatars 56, 58, 60, each of which may have a respective role (e.g., a curator, an artist, and a visitor) in the virtual area 66. The virtual area 54 includes zones 62, 64, 66, 68, 70, 72. (During a typical communication session, the dashed lines demarcating the zones 62-72 in FIG. 4 are not visible to the communicants although there may be visual cues associated with such zone boundaries.) In some examples, each of the zones 62-72 has a respective zone boundary that is associated with a respective <zone_mesh> tag that has a number of attributes (e.g. <zone>, <stream> and <sink> tags) in accordance with the COLLADA Streams Reference specification described in U.S. Pat. Nos. 7,769,806 and 7,844,724.

Figure 5:
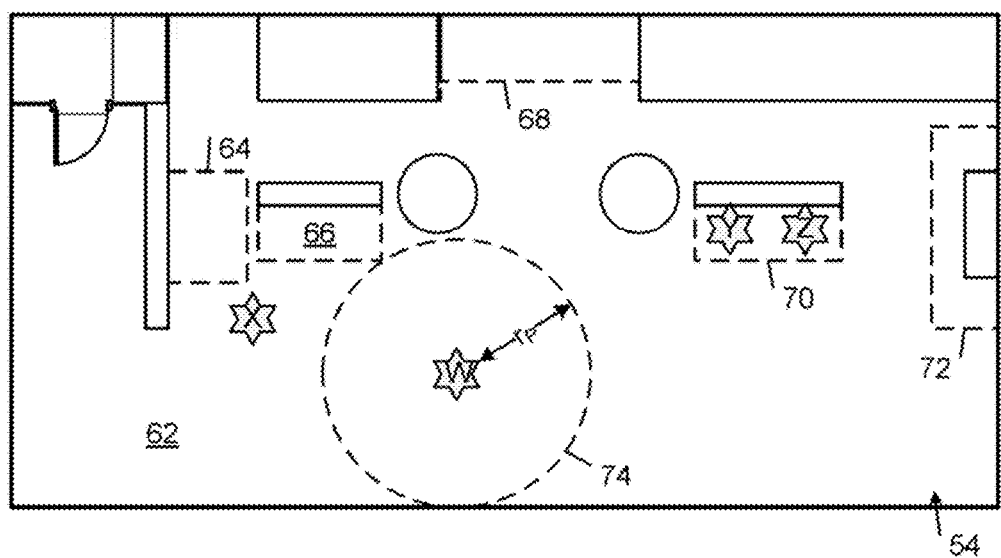
FIG. 5 is a diagrammatic plan-view of the virtual area shown in FIG. 4.

FIG. 5 shows a plan view of the virtual art gallery area 54 at a time when it is populated with four avatars W, X, Y, and, Z. The avatars W and X are positioned in the zone 62 and the avatars Y and Z are positioned in the zone 70. For the purpose of this illustrative example:
  each of the avatars W-Z is associated with voice, video, and chat source types and sink types;
  the switching rules for zone 62 specify that
    each voice source that is associated with an avatar within the zone 62 is to be connected to every voice sink within the zone 62,
    each video source that is associated with an avatar within the zone 62 is to be connected to every video sink within the zone 62, and
    each chat source that is associated with an avatar within the zone 62 is to be connected to every chat sink within the zone 62;
  the switching rules for zone 70 specifies only that that each voice source that is associated with an avatar within the zone 70 is to be connected to every voice sink within the zone 70; and
  the server node executes a message handling service for the virtual area 54 that implements, on top of the zone switching rules, a proximity policy rule that only allows connections of sources with compatible sinks that are associated with respective objects that are within a prescribed distance (or radius), $r_P$, of each other in the virtual area.

In this example, the switching rules and the proximity policy rule provide respective switching conditions that determine how the connections between the avatars W, X, Y, and Z are established.

In operation, the message handling service for the virtual area 54 would send instructions for the area client node that is associated with avatar W to connect to the realtime voice, video, and chat streams that are sourced from the area client node that is associated with avatar X whenever avatar X is positioned within a proximity zone 74, which defined by the prescribed distance $r_P$, around avatar W. Likewise, the message handling service would send instructions for the area client node that is associated with avatar X to connect to the realtime voice, video, and chat streams that are sourced from the area client node that is associated with avatar W whenever avatar W is positioned within the prescribed distance $r_P$ of avatar X. Since avatar X currently is outside the proximity zone 74 of avatar A, and vice versa, the nodes associated with avatars W and X would not be connected to each other in the current exemplary state shown in FIG. 5.

Since the zone 70 only allows voice channels, the message handling service would send instructions for the area client node that is associated with avatar Y to connect to only the realtime voice stream that is sourced from the area client node that is associated with avatar Z (assuming the proximity condition specified in the proximity policy rule is satisfied). Similarly, the message handling service would send instructions for the area client node that is associated with avatar Z to connect to only the realtime voice stream that is sourced from the area client node that is associated with avatar Y (assuming the proximity condition specified in the proximity policy rule is satisfied).

Since the switching rules for zones 62 and 70 do not allow connections between zones 62 and 70, the sources and sinks that are associated with avatars W and X would not be connected to any of the sources and sinks that are associated with avatars Y and Z, even if the proximity condition specified in the proximity policy rule is satisfied.

The network connections between the client network nodes 12, 14 may be arranged in a variety of different data routing topologies, including a peer-to-peer topology, a mediated topology, and hybrid (or mixed mode) topology that combines aspects of peer-to-peer and mediated topologies. In some examples, the intermediate network node 19 mediates data transmissions between the network nodes. In some cases, such mediation by the intermediate network node 19 reduces the number of upload network connections that are required for each client network node, reduces the overall number of client network connections that are required for each client network node, and/or enables virtual area based communications between the client network nodes 12, 14 that cannot communicate peer-to-peer (e.g., when firewall restrictions prevent the client nodes from establishing a direct connection with one another). In these examples, the intermediate network node 19 dynamically creates configurable stream routers between the client network nodes 12, 14. The stream routers typically include directed graphs of processing elements that are configured to process incoming network data in a wide variety of ways (e.g., encoding, protocol conversion, mixing, and effects processing). In some examples, stream routers are customized to accommodate the constraints (e.g., processing, memory, and network connection constraints) of individual network nodes, improving their respective virtual area based communications.

Figure 6:
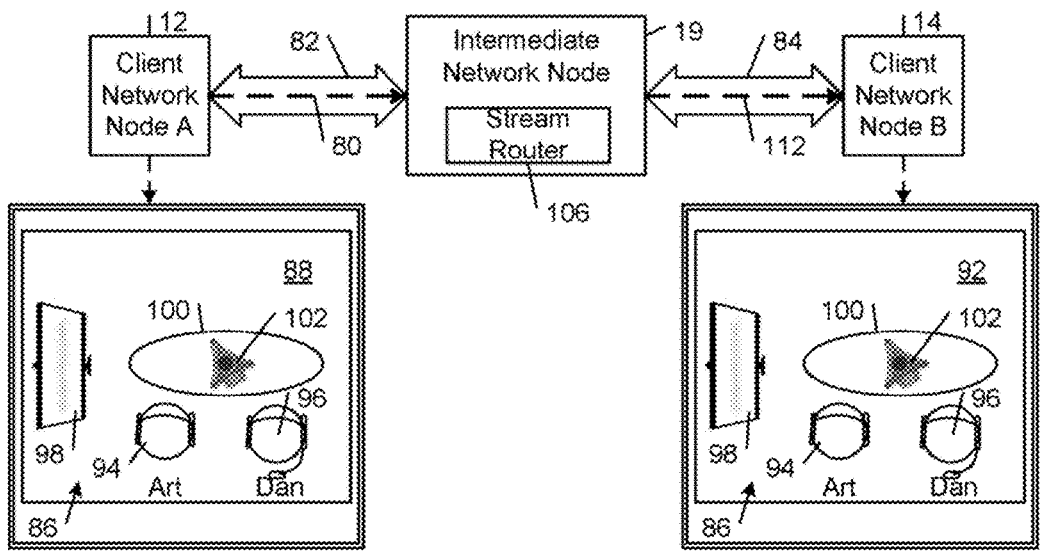
FIG. 6 is a block diagram of an example of an intermediate node routing a data stream from a first client network node to a second client network node in association with a virtual area.

FIG. 6 shows an example of a mediated network communications topology in which the intermediate node 19 routes a data stream 80 from the first client network node 12 to the second client network node 13 over respective network connections 82, 84 between the intermediate network node 19 and the first and second client network nodes 12, 14. In some examples, the server node 40 provisions between each of the client nodes 12, 14 and the intermediate network node 19 sessions over which one or more data type specific channels are transported as described above in connection with FIG. 3.

In the example shown in FIG. 6, the communications applications 26, 32 respectively operating on the first and second client network nodes 12, 14 present respective spatial visualizations 88, 92 (or views) of a virtual area 86 in accordance with data received from the network infrastructure service environment 42. The spatial visualizations 88, 92 include respective graphical representations 94, 96 (referred to herein as "avatars" or "sprites") of the client communicants in spatial relation to a graphical representation of the virtual area 86. The first and second client network nodes 12, 13 have presence in a virtual area 86 through their associations with the objects 94, 96 (e.g., avatars representing respective communicants). The spatial visualizations 88, 92 also may include other objects. Examples of such other objects include a view screen object 98 for application sharing, a table object 100 for file sharing, and a conferencing object 102 for initiating telephone calls to PSTN terminal devices (see U.S. patent application Ser. No. 13/165,729, filed Jun. 21, 2011). In some examples, the avatars 94, 96 are moved about the virtual area 86 based on commands that are input by the communicants at their respective network client nodes 12, 14.

Figure 7:
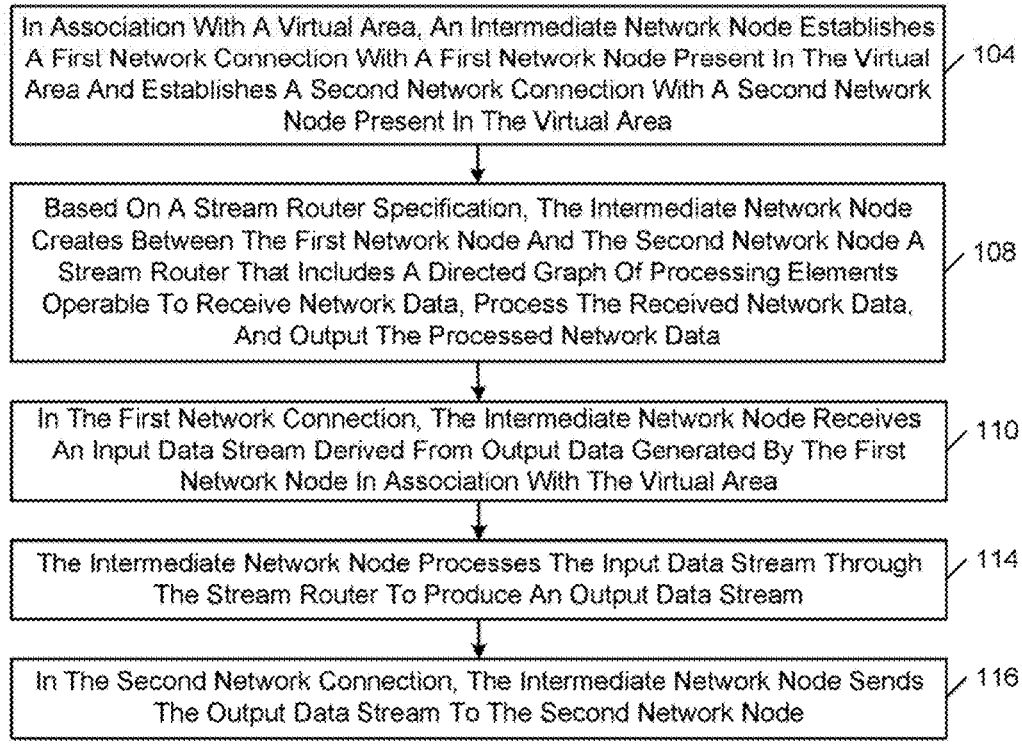
FIG. 7 is a flow diagram of an example of a method of routing virtual area based communications.

FIG. 7 shows an example of a method by which the intermediate network node 19 routes virtual area based communications between the client network nodes 12, 14. In association with the virtual area 86, the intermediate network node 19 establishes the first network connection 82 with the first network node 12, which is present in the virtual area 86, and establishes the second network connection 84 with the second network node 14, which also is present in the virtual area 86 (FIG. 7, block 104). Based on a stream router specification, the intermediate network node 19 creates between the first network node 12 and the second network node 14 a stream router 106 that includes a directed graph of processing elements that receives network data, processes the received network data, and outputs the processed network data (FIG. 7, block 108). On the first network connection 82, the intermediate network node 19 receives the input data stream 80, which is derived from output data (e.g., text chat data, audio data, video data, file sharing data, and application sharing data) that is generated by the first network node 12 in association with the virtual area 86 (FIG. 7, block 110). The intermediate network node 19 processes the input data stream 80 through the stream router 106 to produce an output data stream 112 (FIG. 7, block 114). On the second network connection 84, the intermediate network node 19 sends the output data stream 112 to the second network node 14 (FIG. 7, block 116).

In some examples, the intermediate network node 19 derives the stream router specification from data (e.g., the area application 46 and one or more component libraries) stored on the intermediate network node 19. In other examples, the intermediate network node 19 receives the stream router specification in the form of instructions from another network node (e.g., the server network node 40 shown in FIG. 1). In some examples, the stream router specification specifies the processing elements and an arrangement of the processing elements. The intermediate network node 19 instantiates the specified processing elements and assembles the instantiated processing elements into the directed graph in accordance with the specified arrangement. The intermediate network node 19 also typically determines configuration parameter values with which the intermediate network node configures the processing elements of the directed graph.

In some examples, a directed graph of processing elements includes one or more of: an input processing element (also referred to as a "channel producer") that receives the input data stream on an input socket; an output processing element (also referred to as a "channel consumer") that sends the output data stream on an output socket different from the input socket; a decoder processing element for decoding data derived from the input data stream; an encoder processing element for encoding data derived from the decoded data; a mixing processing element for mixing data with data derived from the input data stream; and a recording processing element for storing one or more data streams or data stream mixes on a computer-readable medium. In some examples, the input processing element and the output processing element are protocol conversion elements that convert the data format, data rate, and/or network protocol of an input data stream to another data format, data rate, and/or network protocol. In some examples, the output processing element consumes the output of an encoder processing element and generates output on a channel (network traffic) that is sent to an input processing element that converts the network data into a format an internal format. In some examples, the converted data produced by the input processing element may be sent to a decoder (e.g., in the case in which the input processing element is running on a client network node) or a different output processing element (e.g., in the case in which the input processing element is running on the intermediate network node 19).

In some examples, the input data includes audio data, and the directed graph includes an audio processing element for processing audio data derived from the input data stream. In some examples, the input data includes video data, and the directed graph includes a video processing element for processing video data derived from the input data stream.

Figure 8:
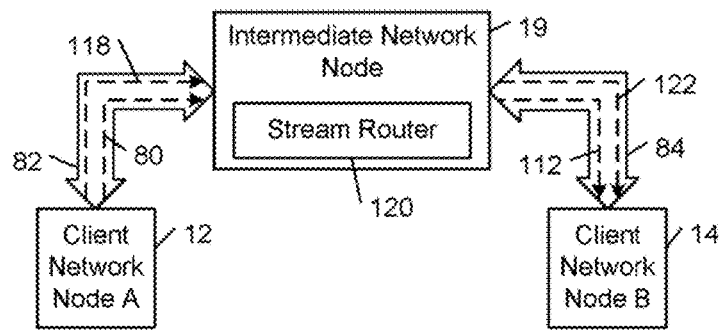
FIG. 8 is a block diagram of an example of an intermediate node routing two data streams from a first client network node to a second client network node.

FIG. 8 shows an example of the intermediate node 19 routing the first data stream 80 and a second data stream 118 from the first client network node 12 to the second client network node 14. In this example, the intermediate network node 19 creates at least one stream router 120 that defines two data routes from the first network node 12 to the second network node 14, where each data route includes a respective directed graph of processing elements for receiving a respective one of the first and second data streams 80, 118, processing the received data stream, and outputting the processed data stream. In some examples, at least one of the processing elements of the stream router 120 is shared by both the first and second constituent data routes. On the first network connection 82, the intermediate network node 19 receives the first and second input data streams 80, 118 in association with the virtual area 86. The intermediate network node 19 processes the first and second input data streams 80, 118 through the first and second data routes to produce the first output data stream 112 and a second output stream 122. On the second network connection 84, the intermediate network node 19 sends the first and second output data streams 112, 122 to the second network node 14. In some examples, the first input data stream 80 and the first output data stream 112 are audio content data streams, and the second input data stream 118 and the second output data stream 122 are video content data streams.

In some examples, the intermediate network node 19 stores definitions of respective channels that logically divide data transported on first and second connections 82, 84 by data stream content type. For example, in the routing situation shown in FIG. 8, the intermediate network node 19 would receive the first and second input data streams 80, 118 on the first connection 82 in respective channels according to content types of the first and second input data streams 80, 118, and would send the first and second output data streams 112, 122 on the second connection 84 in respective channels according to content types of the first and second output data streams 112, 122. In some examples, each of the channel definitions includes a respective unique content identifier that identifies a respective data stream content type that is assigned to the respective channel. In these examples, the intermediate network node 19 receives the first and second input data streams 80, 118 on respective channels in packets containing respective ones of the content identifiers corresponding to the content types of the first and second input data streams 80, 118, and sends the first and second output data streams 112, 122 on respective channels in packets containing respective ones of the content identifiers corresponding to the content types of the first and second output data streams 112, 122.

Figure 9:
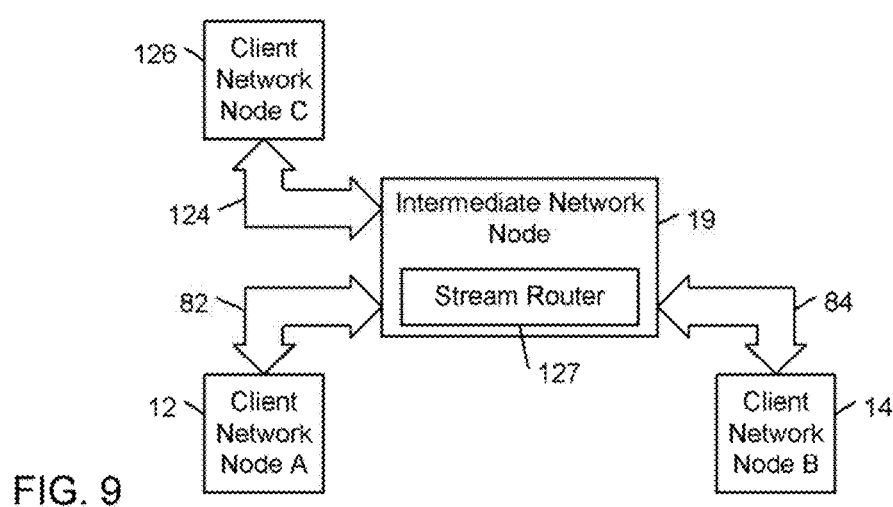
FIG. 9 is a block diagram of an example of network connections between an intermediate network node and three client network nodes.

FIG. 9 shows an example of network connections 82, 84, 124 between the intermediate network node 19 and each of the first client network node 12, the second client network node 14, and a third client network node 126. In this example, the third network node 126 also is present in the virtual area 86, and the intermediate network node 19 establishes the third network connection 124 with the third network node 126 in association with the virtual area 86. The intermediate network node 19 creates between the third network node 126 and the second network node 14 at least one stream router 127 that includes at least one directed graph of processing elements that receives network data, processes the received network data, and outputs the processed network data.

Figure 10:
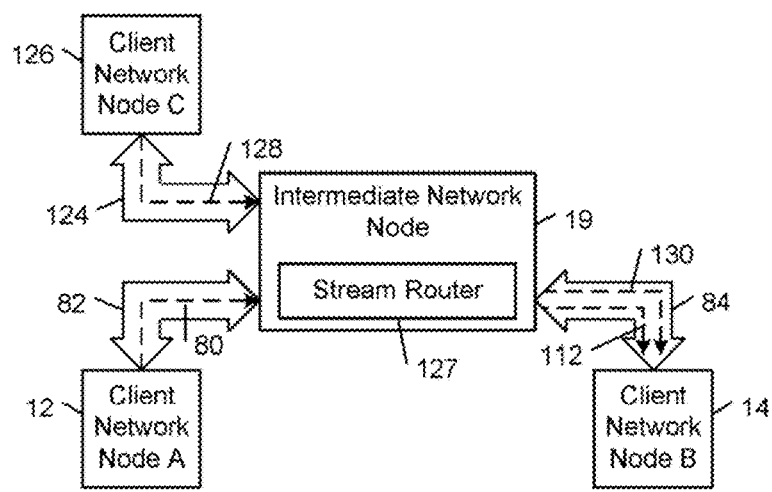
FIG. 10 is a block diagram of an example of an intermediate node routing respective data streams received from two client network nodes as separate data streams to a third client network node.

FIG. 10 shows an example of the connections 82, 84, 124 shown in FIG. 9 in which the intermediate network node 19 receives on the third network connection 124 a second input data stream 128 that is derived from output data generated by the third network node 126 in association with the virtual area 86. In this example, the intermediate network node 19 processes the first and second input data streams 80, 128 through the at least one stream router 127 to produce the first output data stream 112 and a second output data stream 130. On the second network connection 84, the intermediate network node 19 sends the first and second output data streams 112, 130 to the second network node 14.

Figure 11A:
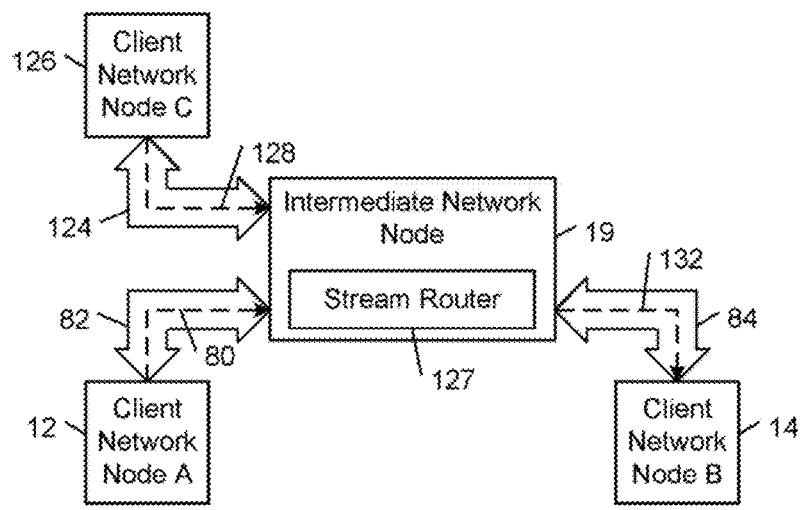
FIG. 11A is a block diagram of an example of an intermediate node routing respective data streams received from two client network nodes as a single mixed data stream to a third client network node.

FIG. 11A shows an example of the connections 82, 84, 124 shown in FIG. 9 in which the intermediate network node 19 processes the first and second input data streams 80, 128 through the stream router 127 to produce a mixed data stream 132 from the first and second input data streams 80, 128 and sends the mixed data stream 132 to the second network node 14. In some examples, the directed graphs of the stream router 127 share at least one of their respective processing elements.

Figure 11B:
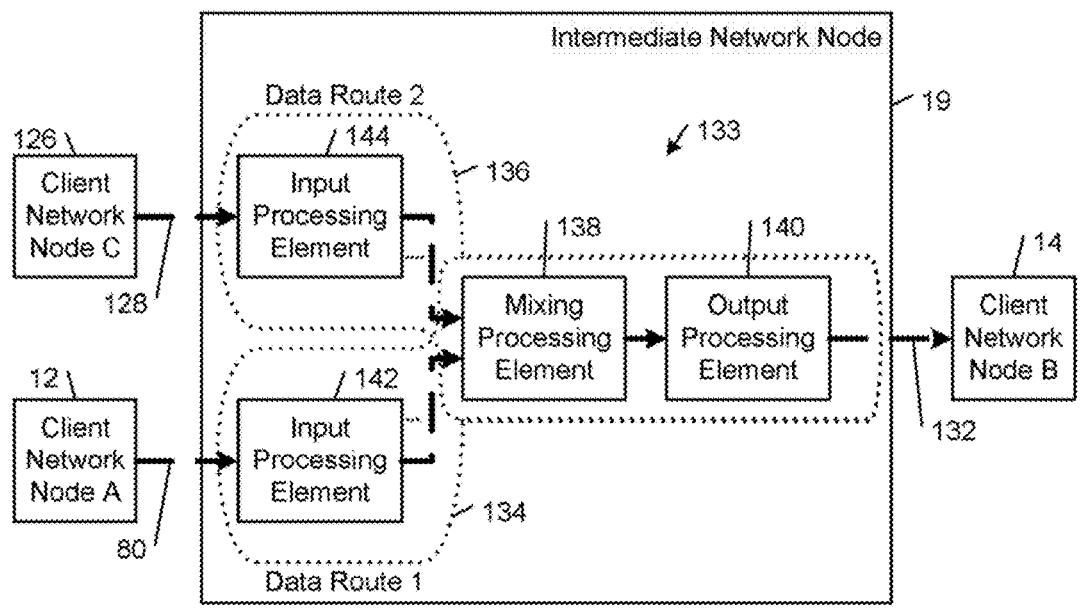
FIG. 11B is a block diagram of an example of a stream router created by an intermediate network node for routing respective data streams received from two client network nodes as a single mixed data stream to a third client network node as shown in FIG. 11A.

FIG. 11B shows an example of the connections 82, 84, 124 shown in FIG. 11A in which the intermediate network node 19 creates a stream router 133 that has two data routes 134, 136 for processing the first and second input data streams 80, 128 respectively received from the first and third client network nodes 12, 126 into the single mixed data stream 132 that is sent to the second client network node 14. In this example, the first data route 134 and the second data route 136 share a mixing processing element 138 that processes data derived from the first and third input data streams 80, 128 to produce a mixed data stream. The first and second stream routers 134, 136 also share an output processing element 140 that processes the mixed data stream to produce the output data stream 132. The first data route 134 additionally includes a first input processing element 142 for receiving the first input data stream 80 on a first input socket, and the second data route 136 additionally includes a second input processing element 144 for receiving the second input data stream 128 on a second input socket different from the first input socket. In some examples, the input processing elements 142, 144 and the output processing element 140 are protocol conversion processing elements of the type described above. In some of these examples, the input processing elements 142, 144 convert the input data streams 80, 128 from an incoming network protocol (e.g., User Datagram Protocol, UDP) into an internal proprietary protocol (e.g., the STRAW protocol described in U.S. patent application Ser. No. 12/630,973, filed Dec. 4, 2009, and the output processing element 140 converts the mixed data stream produced by the mixing processing element 138 from the internal proprietary protocol to an outgoing network protocol (e.g., UDP).

As explained above, the network connections between the client network nodes 12, 14 may be arranged in a variety of different data routing topologies, including a peer-to-peer topology, a mediated topology, and a hybrid (or mixed mode) topology that combines aspects of peer-to-peer and mediated topologies.

Figure 12A:
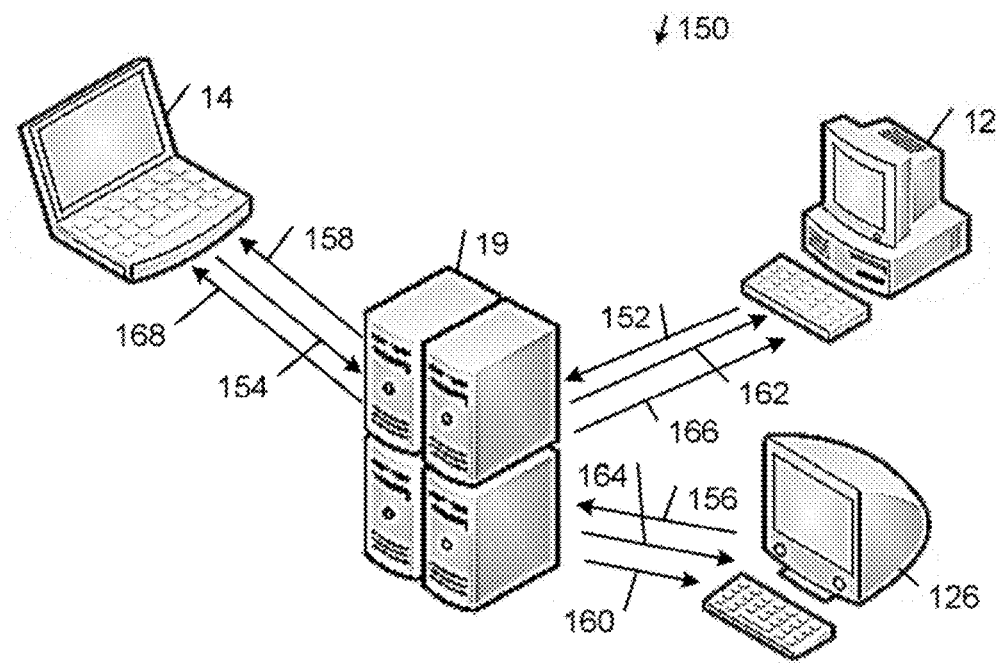
FIG. 12A is a diagrammatic view of an example of a mediated data routing topology.

FIG. 12A shows an embodiment of a sever-mediated realtime data routing topology 150 in which the intermediate network node 19 serves as a transceiver switch that relays realtime data streams between the client network nodes 12, 14, 126. In the topology 150, each of the client network nodes 12, 14, 126 uploads a respective set 152, 154, 156 of realtime data streams to the intermediate network node 19, which relays output data streams corresponding to the uploaded streams to the client network nodes 12, 14, 126 in accordance with their respective requirements. Thus, the intermediate network node 19 transmits a respective output data stream 158, 160 derived from the stream set 152 uploaded by client network node 12 to each of the other client network nodes 14, 126; the intermediate network node 19 transmits a respective output data stream 162, 164 derived from the stream set 154 uploaded by area client 14 to each of the other area clients 12, 126; and the intermediate network node 19 transmits a respective output data stream 166, 168 derived from the stream set 156 uploaded by client network node 126 to each of the other area clients 12, 14. The stream sets 158-168 include all the realtime data streams that are required to connect the objects in a virtual area in accordance with their respective positions in virtual area. Each of these streams is packetized into packets, each of which includes a header that contains a source identifier field that identifies the source of the packet, a sequencing number, and other information.

Figure 12B:
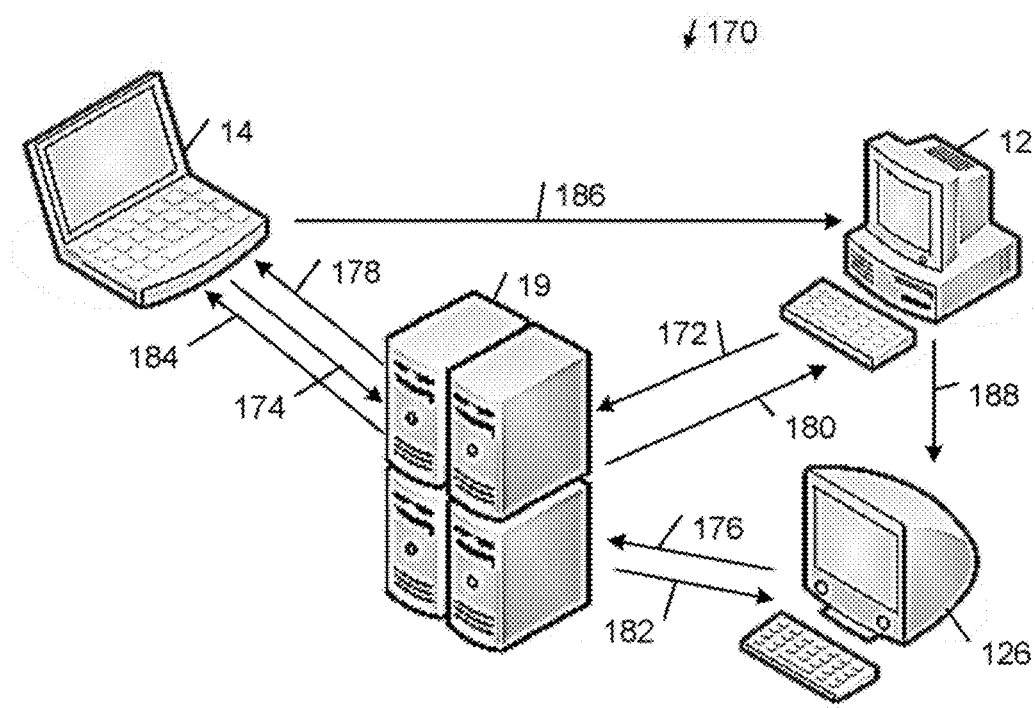
FIG. 12B is a diagrammatic view of an example of a mediated data routing topology.

FIG. 12B shows an embodiment of a realtime data routing topology 170 that dynamically combines elements of peer-to-peer and mediated data routing topologies. In the topology 170, each of the client network nodes 12, 14, 126 uploads a respective set 172, 174, 176 of required realtime data streams to the intermediate network node 19. The intermediate network node 19 sends an output data stream 178 derived from the stream set 172 that was uploaded by the client network node 12 to the area client 14; the intermediate network node 19 sends respective output data streams 180, 182 derived from the stream set 174 that was uploaded by client network node 14 to each of the other client network nodes 12, 126; and the intermediate network node 19 sends an output data stream 184 derived from the stream set 176 that was uploaded by the area client 126 to the client network node 14. In addition, the client network node 12 receives the required stream set 186 directly from the client network node 14, and the client network node 126 receives the required stream set 188 directly from the client network node 12. The stream sets 178-188 include all the realtime data streams that are required to connect the objects in the virtual area 86 in accordance with their respective positions in virtual area. Each of these streams is packetized into packets, each of which includes a header that contains a source identifier field that identifies the source of the packet, a sequencing number, and other information.

In some examples, communications between the network nodes are improved by dynamically switching the topology of network connections between the client network nodes 12, 14 from one network topology to another.

Figure 13:
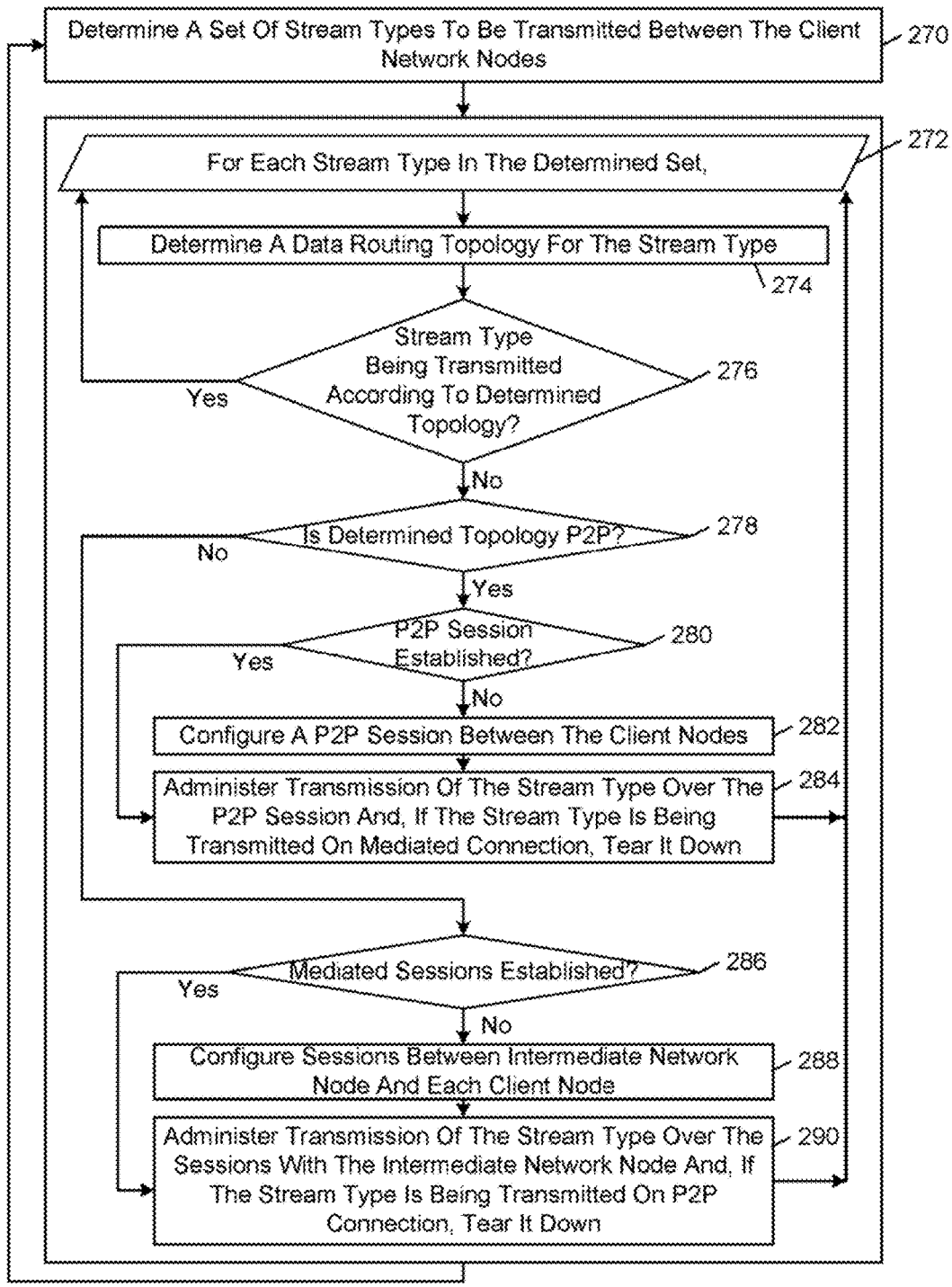
FIG. 13 is a flow diagram of an example of a method of routing virtual area based communications.

FIG. 13 shows an example of a method of routing data streams between network nodes in connection with a virtual area. The method typically is performed by a network node (e.g., the intermediate network node 19, or another network node, such as the server node 40, a network switch, or a client network node, that controls the establishing and tearing down of connections between the intermediate network node 19 and the client network nodes 12, 14 and controls the creating and tearing down of stream routers by the intermediate network node 19). For illustrative purposes only, this example describes the routing of a single data stream type (e.g., audio or video) between the client network nodes 12, 14 over a peer-to-peer or mediated network connection (e.g., a channel on a session); however, the method may be applied to any number of client network nodes and data stream types, either individually or collectively.

The method of FIG. 13 is responsive to events (e.g., events relating to actions, behaviors, or states) in a virtual area. In some examples, the method is responsive to state change event notifications (e.g., notifications of headphones turned on, doors opened, communicants' avatars moved from one zone to another, etc.).

In response to an event (e.g., a state change event), a set of stream types to be transmitted between the client network nodes is determined (FIG. 13, block 270). In some examples, the set of stream types depends on the local configurations of the clients' local sources and sinks (e.g., microphone state and speaker state), the locations in which the communicants are present, and the switching rules associated with those locations (see, e.g., § VI.C in U.S. Pat. No. 7,769,806).

For each stream type in the determined set of stream types (FIG. 13, block 272, a data routing topology is determined for the stream type (FIG. 13, block 274). If the stream type is being transmitted according to the determined topology (FIG. 13, block 276), the process is repeated for the next stream type (FIG. 13, block 272).

If the stream type is not being transmitted according to the determined topology (FIG. 13, block 276), the determined topology is peer-to-peer (P2P) (FIG. 13, block 278), and a P2P session on which to transmit the stream type already is established (FIG. 13, block 280), then transmission of the steam type over the P2P session is administered and, if the stream type currently is being transmitted on a mediated connection (e.g., a channel on the mediated session), then the mediated connection is torn down (FIG. 13, block 284) or reconfigured as a standby route; if the P2P session on which to transmit the stream type is not established (FIG. 13, block 280), then a P2P session between the respective client network nodes is established (FIG. 13, block 282) before the transmission of the stream type is administered and any mediated connection is torn down or reconfigured as a standby route (FIG. 13, block 284).

If the determined topology is mediated (FIG. 13, block 278), and mediated sessions between the intermediate node 19 and each client network node already are established (FIG. 13, block 286), then transmission of the stream type over the sessions with the intermediate network node 19 is administered and, if the stream type currently is being transmitted on a P2P connect between the client network nodes (e.g., a channel on a P2P session), then the P2P connection is torn down or reconfigured as a standby route (FIG. 13, block 290); if the mediated sessions on which to transmit the stream type are not established (FIG. 13, block 286), then the sessions between the intermediate network node 19 and the client network nodes are established (FIG. 13, block 288) before the transmission of the stream type is administered and any P2P connection is torn down or reconfigured as a standby route (FIG. 13, block 290).

The data routing topology for a given stream type may be determined (FIG. 13, block 274) based on one or more factors, including the switching rules associated with the locations in which the communicants are present, and a topology switching predicate that conditions the switching from a currently active network topology to another network topology on satisfaction of one or more criteria. Examples of such criteria include, with respect to a particular zone of a virtual area: the number of client network nodes associated with the zone; the type of content of the data streams being communicated between network nodes associated with the zone; the bandwidth capabilities of the client network nodes associated with the zone; the attributes of the zone (e.g., network topology preferences); current network latencies experienced by the client network nodes; and packet losses experienced by the client network nodes. Examples of topology switching predicates include:

If the number of network nodes that are associated with a zone and are communicating audio data streams exceeds a threshold, switch the audio channels for some or all client network nodes from a peer-to-peer network connection to a mediated network connection;

If the number of network nodes that are associated with a zone and are communicating video data streams exceeds a threshold, switch the video channels for some or all client network nodes from a peer-to-peer network connection to a mediated network connection;

If the measured packet loss exceeds a packet loss threshold and the measured latency exceeds a latency threshold for a given client network node, switch all media channels (e.g., audio and video channels) for the given client network node from a peer-to-peer network connection to a mediated network connection.

In some examples, the default data routing topology for one or more stream types (e.g., audio, video, chat, and screen share) is P2P, and the system switches to a mediated topology for respective ones of the stream types based on the respective topology switching predicates for the stream types. In some examples, low latency peer-to-peer connections (e.g., connections with round-trip latencies less than 5 milliseconds) remain peer-to-peer even certain conditions (e.g., number of network nodes that are associated with a zone) that otherwise would trigger a transition to a mediated connection are satisfied. In these examples, such low latency P2P connections are assumed to be on a network (e.g., a local area network) for which bandwidth constraints are not an issue. In some examples of this type, a client network node transmits audio or video to a number of peers who meet the latency criteria over P2P connections, and transmits audio or video to other client network nodes that do not meet the latency criteria using a single connection through the Media Node.

In some examples, before a mediated connection can be established, the intermediate network node 19 must be active and connected to the server network node 40, each client network node must have a session configured with the intermediate network node by the server node 40, and once configured each node in that session must have reported an active session with the other node. Once these conditions are met, the server network node 40 will configure the mediated stream. If these conditions are not met (or are no longer met) the server network node 40 will configure a P2P stream instead. At the point that a stream connection (e.g., either a P2P or mediated connection) is being configured, if there is an existing stream connection of the other topology type, the existing stream connection gets torn down concurrently with the configuration of the new stream connection. In these examples, the stream connections are layered on top of sessions. A client network node may have both P2P and mediated sessions to the same peer client network node while the new data routing topology is being established, and in some cases even after data is flowing through the new data routing topology.

Figure 14A:
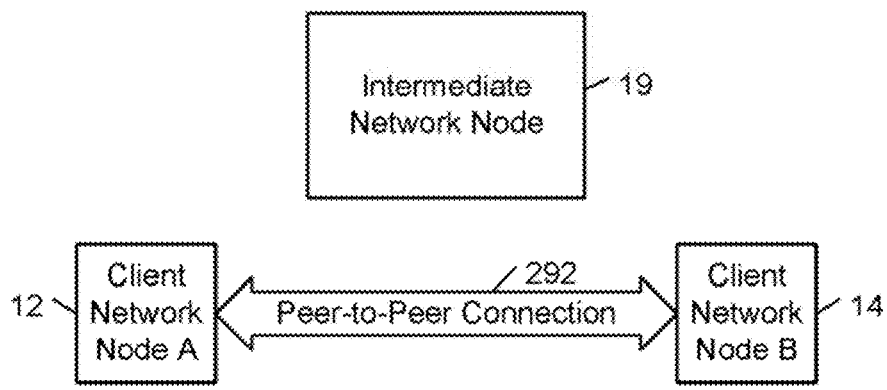
FIGS. 14A-14C are block diagrams of examples of connections established between an intermediate network node and two client network nodes transitioning from a peer-to-peer network communication topology to a mediated network communication topology.
Figure 14B:
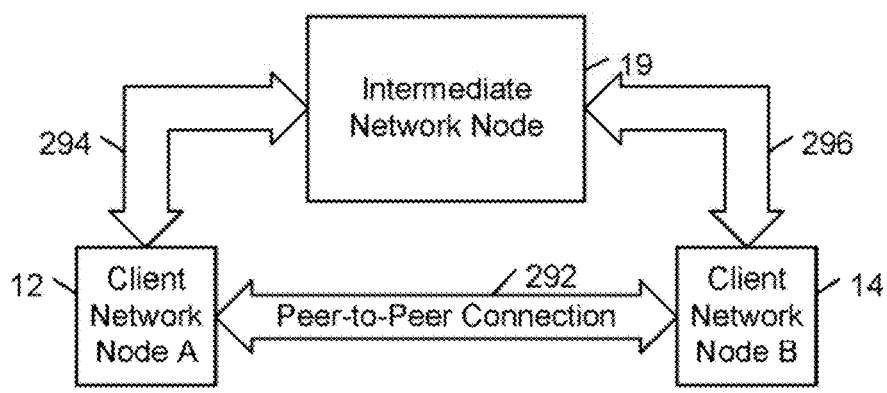
Figure 14C:
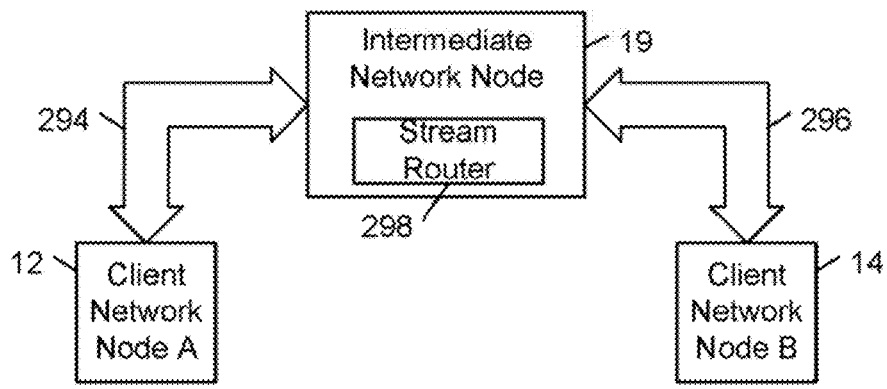

FIGS. 14A-14C show examples of connections that are established between the intermediate network node 19 and the client network nodes 12, 14 in transitioning from a peer-to-peer network communication topology to a mediated network communication topology. In FIG. 14A, the first and second client network nodes 12,14 are communicating data streams of one or more data content types (e.g., audio and/or video) over a peer-to-peer network connection 292. In some examples, the client network nodes 12, 14 create respective stream handlers of the type described in U.S. patent application Ser. No. 12/630,973, filed Dec. 4, 2009, for receiving and processing the data streams. Referring to FIG. 14B, in response to a determination that the topology switching predicate for switching from a P2P topology to a mediated topology is met, the server network node 40 establishes network connections 294, 296 between the intermediate network node 19 and each of the client network nodes 12, 14. While the connections 294, 296 are being established, the first and second client network nodes 12, 14 may transmit data over the peer-to-peer network connection 292. As shown in FIG. 14C, after the intermediate network node connections 294, 296 have been established, the first and second client network nodes 12, 14 tear down the peer-to-peer network connection 292, the intermediate network node 19 creates at least one stream router 298 for processing data received on the connections 294, 296, and the first and second client network nodes 12, 14 communicate the data streams of the one or more content types over the intermediate network node connections 294, 296.

In some examples, the intermediate network node 19 is unable to establish sessions without receiving provisioning information from the server network node 40. In some examples, the intermediate network node 19 can tear down sessions on its own. In some examples, the intermediate network node 19 is configured to determine data routing topologies and set-up data stream mixing scenarios on its own.

Figure 15A:
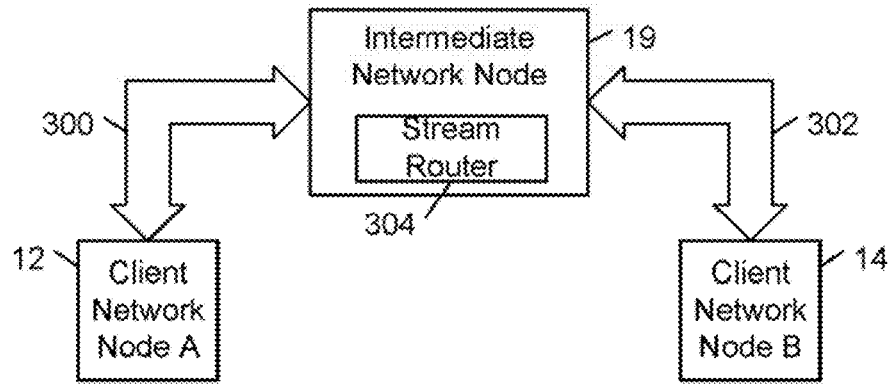
FIGS. 15A-15C are block diagrams of examples of connections established between an intermediate network node and two client network nodes transitioning from a mediated network communication topology to a peer-to-peer network communication topology.
Figure 15B:
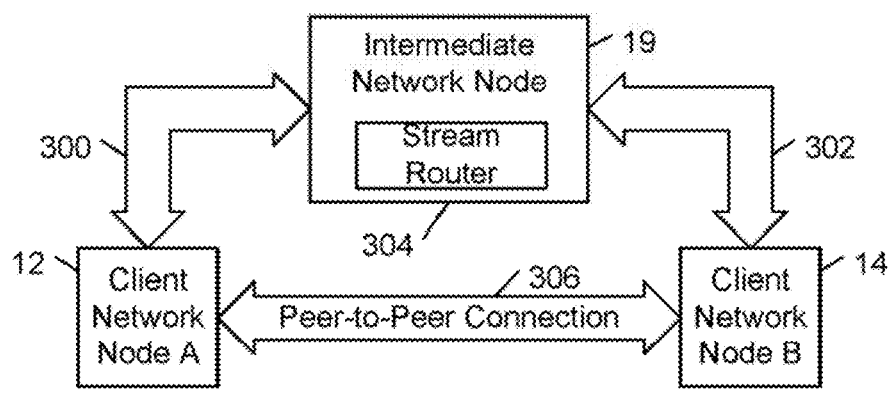
Figure 15C:
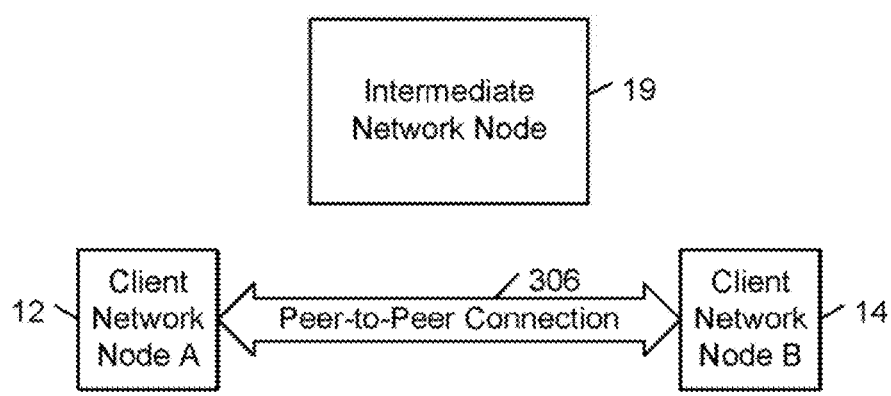

FIGS. 15A-15C show examples of connections established between the intermediate network node 19 and the client network nodes 12, 14 in transitioning from a mediated network communication topology to a peer-to-peer network communication topology. In FIG. 15A, the first and second client network nodes 12,14 are communicating data streams of one or more data content types (e.g., audio and/or video) over respective network connections 300, 302 through at least one stream router 304 created by the intermediate network node 19 for processing data received on the connections 300, 302. Referring to FIG. 15B, in response to a determination that the topology switching predicate for switching from a mediated network topology to a P2P network topology is met, the server network node 40 provisions a P2P session between the client network nodes 12, 14, and the client network nodes 12, 14 establish a peer-to-peer network connection 306 with each other. While the P2P session is being established, the first and second client network nodes 12, 14 may transmit data over the intermediate network node connections 222, 224. In response to notification that the peer-to-peer session has been established or in response to instructions received from the remote controlling network node, the intermediate network node 19 tears down the stream router 304 and its network connections 300, 302 with the client network nodes 12, 14. As shown in FIG. 15C, after the intermediate network node connections 300, 302 have been torn down, the first and second client network nodes 12, 14 communicate the data streams of the one or more content types over the peer-to-peer network connection 306.

In some examples a network connection may be configured using both mediated and peer-to-peer route configurations, with multiple media channels capable of transmitting the same content over the different route configurations. In these examples, only one of the media channels is active at any given time; the other redundant channels re configured in stand-by mode with the content flow "muted". In some of these examples, the routing topology controller (e.g., the server node 40) dynamically changes which of the alternate route configurations currently is active channel over time based on one or more factors (e.g., topology changes on the network).

The intermediate network node 19 may be any type of network node that is capable of establishing network connections with client network nodes in association with a virtual area, and creating stream routers for receiving network data generated by at least one of the client network nodes in association with the virtual area, processing the received network data, and outputting the received network data to at least one of the network nodes. Examples of intermediate network node types include server network nodes, client network nodes, and network switches.

Figure 16A:
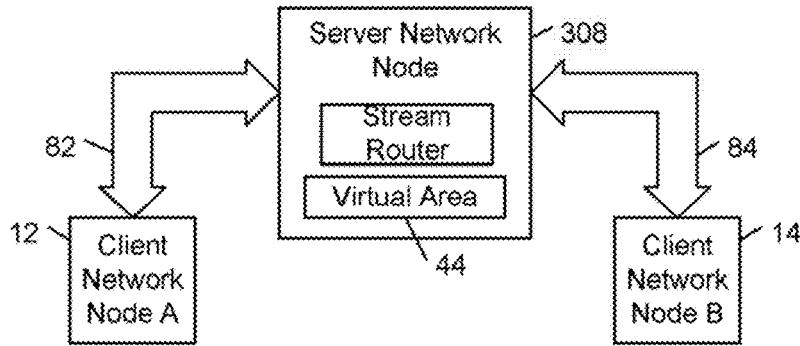
FIG. 16A is a block diagram of an example of a server network node acting as an intermediate node for routing a data stream from a first client network node to a second client network node.

FIG. 16A shows an example of a server network node 308 acting as an intermediate network node for routing data streams between the first client network node 12 and the second client network node 14. In this example, in addition to serving as the intermediate network node, the server network node 308 also may provide the network infrastructure service environment 42 that manages sessions of the first and second client nodes 12, 14 in one or more virtual areas 44 in accordance with respective virtual area applications 46.

Figure 16B:
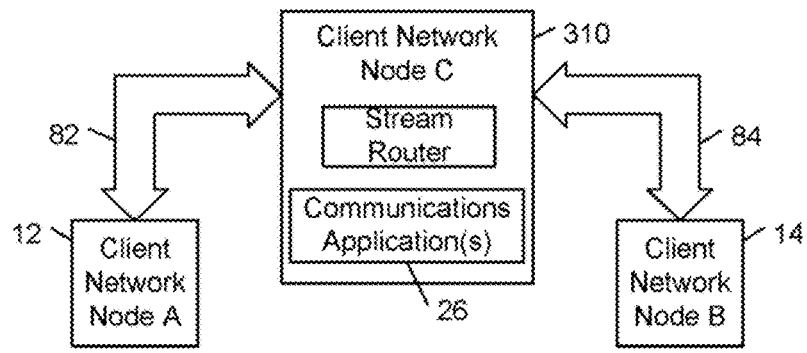
FIG. 16B is a block diagram of an example of a client network node acting as an intermediate node for routing a data stream from a first client network node to a second client network node.

FIG. 16B shows an example of a client network node 310 acting as an intermediate network node for routing data streams between the first client network node 12 and the second client network node 14. In this example, in addition to routing data between the first and second client network nodes, the intermediate network node 310 is present in the virtual area and typically is associated with an object that represents a communicant in the virtual area. In some examples, a client network node 310 is dynamically promoted to function as an intermediate network node based on a network topology switching predicate of the type described above. In one exemplary scenario, communicants are operating respective client network nodes to communicate and interact in a virtual area. A first set of the client network nodes are connected directly to a high-speed, high-bandwidth network, whereas a second set of the client network nodes are connected to the virtual area through slower and lower bandwidth virtual private network (VPN) connections. In this scenario, one of the client network nodes in the first set is promoted to serve as an intermediate node for the network nodes in the second set. In this case, for each data type (e.g., audio or video), instead of sending a respective data stream to each client network in the group in accordance with a P2P network topology, each network node in the second set now sends a single data stream to the promoted client network node. The promoted client network node in turn multiplexes the data streams received from the client network nodes in the second set to the other network nodes in the virtual area. The promoted client network node also may send to each of the VPN-connected client network nodes a respective stream mix created from the data streams of the other network nodes in the virtual area. In this way, the promoted client network node is able to reduce the bandwidth needed by the VPN-connected network nodes to communicate and interact in the virtual area.

In some examples, the intermediate network node 19 also serves as a proxy server that enables the client network nodes 12, 14 to communicate P2P. In these examples, the intermediate network node 19 determines public network addresses and ports of network address translators (NATs) through which the client network nodes 12, 14 respectively operate, and transmits the public network addresses and ports to the first and second network nodes 12, 14. The client network nodes 12, 14 establish a peer-to-peer network connection with one another based on the transmitted public network addresses and ports. In some of these examples, the client network nodes communicate P2P in accordance with the Simple Traversal of UDP through Network Address Translators (abbreviated STUN) network protocol. In these examples, the intermediate network node 19 acts as a STUN server, which listens at two IP addresses in the network on the public side of the NATs and reports the mapped IP addresses and ports on the outside of the NATs. From this information, the client network nodes 2, 14 are able to discover the presence and specific type of NAT, and obtain the mapped (external) IP address (NAT address) and port number that the NAT has allocated for the clients' UDP connections to remote hosts. The client network nodes 12, 14 then use the external IP addresses to communicate with one another P2P in accordance with the UDP protocol. Additional details regarding the STUN protocol can be obtained from Jonathan Rosenberg et al., "STUN—Simple Traversal of User Datagram Protocol (UDP) Through Network Address Translators (NATs)," Internet proposed standard RFC 3489 (March 2003).

Figure 17:
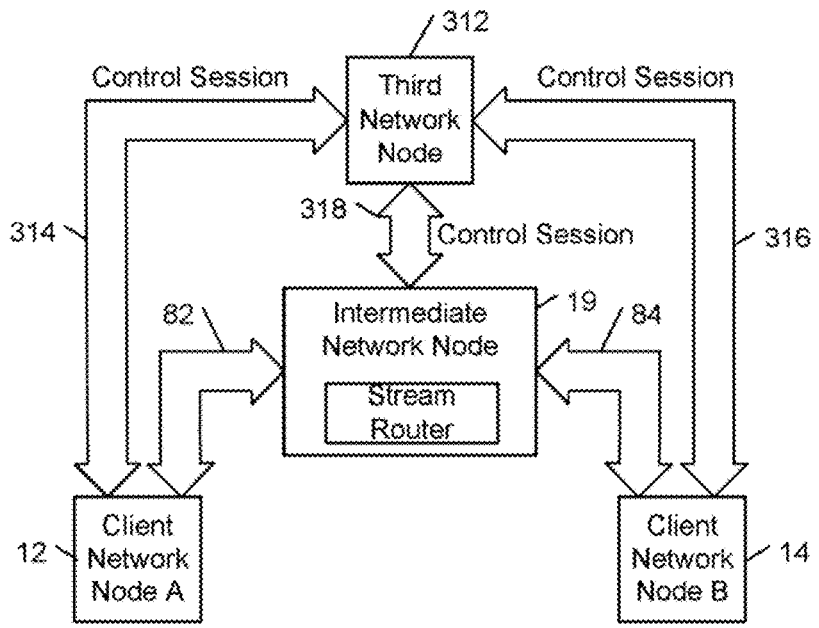
FIG. 17 is a block diagram of an example of a third network node controlling routing of data streams by an intermediate node between a first client network node and a second client network node.

FIG. 17 shows an example of a third network node 312 that controls the routing of data streams by the intermediate node 19 between the first client network 12 node and the second client network node 14. The third network node 312 establishes a first control session 314 with the first network node 12, a second control session 316 with the second network node 14, and a third control session 318 with the intermediate node 19. On the first, second, and third control sessions 314-318 the third network node 312 transmits to the first, second, and intermediate network nodes 12, 14, 19 respective control messages that administer the establishing of the first and second network connections 82, 84 and the transmission of data on those connections 82, 84. In some examples, each of the control sessions is assigned a respective unique session identifier that is associated with the virtual area in which the first and second network nodes 12, 14 are present, and the third network node 312 communicates the respective session identifiers with the control messages that are sent to the first, second, and intermediate network nodes 12, 14, 19 on the first, second, and third control sessions 314-318.

In some examples, the third network node 312 determines the stream router specifications from a specification of the virtual area and the locations (e.g., zones) where the first and second network nodes are present in the virtual area. In some examples, there is a standard set of media channel routes (e.g., an audio channel route and a video channel route). A standard media channel route is built up from various smaller routes that can persist (e.g., an encoder route can be instantiated and then hooked up to channel consumers for any number channels to connect to, and when one channel is torn down only that one sub-route is torn down). A standard media channel route, for example, has an encoder sub-route, a source sub-route (how I send to you), and a sink sub-route (how you send to me). In some of these examples, the virtual area specification maps references to generic sub-routes to node-type-specific processing element configurations. For example, a generic "encoder" sub-route may map to a number of node-type specific encoder configurations (e.g., a standard Windows® client uses Encoder_1, whereas a PSTN client uses Encoder_2). Therefore, the encoder sub-route, the source sub-route, and the sink sub-route of a standard media channel route can be different for each type of network node. For example, for a standard Windows® client communications application 26, 32, the encoder sub-route would connect output of microphone to a default encoder (specified by area server 40, along with the specific codec and codec parameters to use), whereas for a PSTN client, the encoder sub-route connects the SIP output from a SIP source (e.g., a reSIProcate producer, as described in U.S. patent application Ser. No. 13/165,729, filed Jun. 21, 2011) to a default encoder. The source sub-route includes a channel consumer component that converts the output of the encoder sub-route into a network protocol format and outputs the formatted data onto a network connection. The sink sub-route includes a channel producer component that converts the network data into a format that can be processed by an encoder sub-route (e.g., a media decoder).

Thus, from the virtual area specification, the third network node 312 ascertains the generic sub-routes that are associated with the locations of presence of the first and second nodes 12, 14 in the virtual area, ascertains the node-type-specific element configurations corresponding to node types of the first and second network nodes 12, 14, and creates the stream router specification based on the ascertained node-type-specific element configurations.

On the third control session 318, the third network node 312 sends to the intermediate network node 19 specifications of the stream routers to be created between the first and second network nodes 12, 14. Each stream router specification specifies a set of processing elements, a directed graph arrangement of the processing elements in the set, and configuration parameter values for the processing elements. Based on the received stream router specification, the intermediate network node 19 instantiates the specified processing elements, assembles the instantiated processing elements into a directed graph in accordance with the specified arrangement, and configures the processing elements with the specified configuration parameter values.

In some examples, the third network node 312 also sends a source stream handler specification to the first network node 12 and a sink stream handler specification to the second network node 14. The source stream handler specification defines a source stream handler that includes a directed graph of processing elements operable to process local data generated by the first network node 12 and output the processed local data to the intermediate network node 19 on the first network connection 314. The sink stream handler specification defines a sink stream handler that includes a directed graph of processing elements operable to receive network data from the intermediate node 19 on the second network connection 316 and process the received network data into local data. In some of these examples, the stream router specification sent to the intermediate network node 19 and the stream handler specifications sent to the client network nodes reference a common library of processing element (e.g., plugin) definitions. In some of these examples, the client network nodes 12, 14 and the intermediate network node 19 create respective stream handlers for receiving and processing the data streams transmitted on mediated and P2P sessions from a common library of directed graph processing elements of the type described in U.S. patent application Ser. No. 12/630,973, filed Dec. 4, 2009.

In some examples, the third network node 312 may be any type of network node that is capable of establishing control sessions with client and intermediate network nodes in association with a virtual area, sending specifications of stream routers to the intermediate network nodes, and sending to the client and intermediate network nodes instructions for establishing and tearing down network connections (e.g., content-specific channels on sessions). Examples of the types of network nodes that can operate as the third network node 312 include a server network node, a network switch, and a client network node.

Figure 18A:
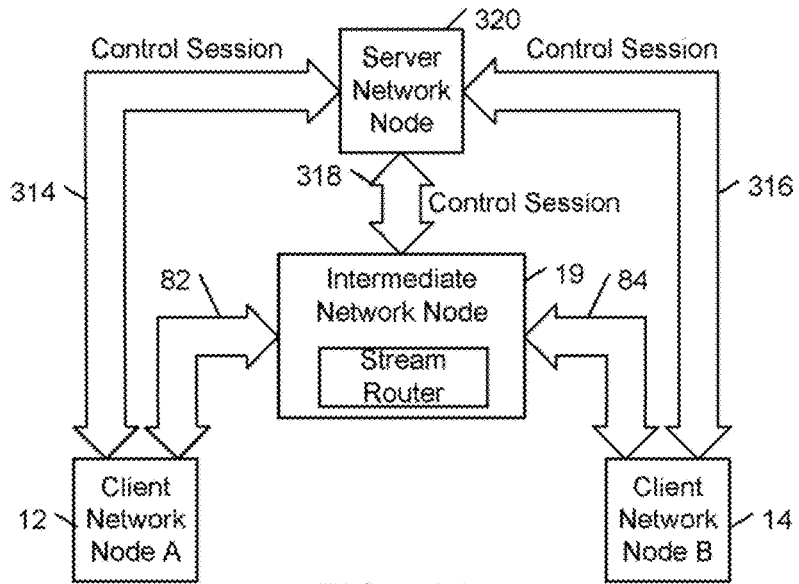
FIG. 18A is a block diagram of an example of a server network node controlling routing of data streams by an intermediate node between a first client network node and a second client network node.

FIG. 18A shows an example of a server network node 320 that acts as the third network node 312 in controlling routing of data streams by the intermediate node 19 between the first client network node 12 and the second client network node 14. In this example, in addition to serving as the intermediate network node, the server network node 320 may provide the network infrastructure service environment 42 that manages sessions of the first and second client nodes 12, 14 in one or more virtual areas 44 in accordance with respective virtual area applications 46.

Figure 18B:
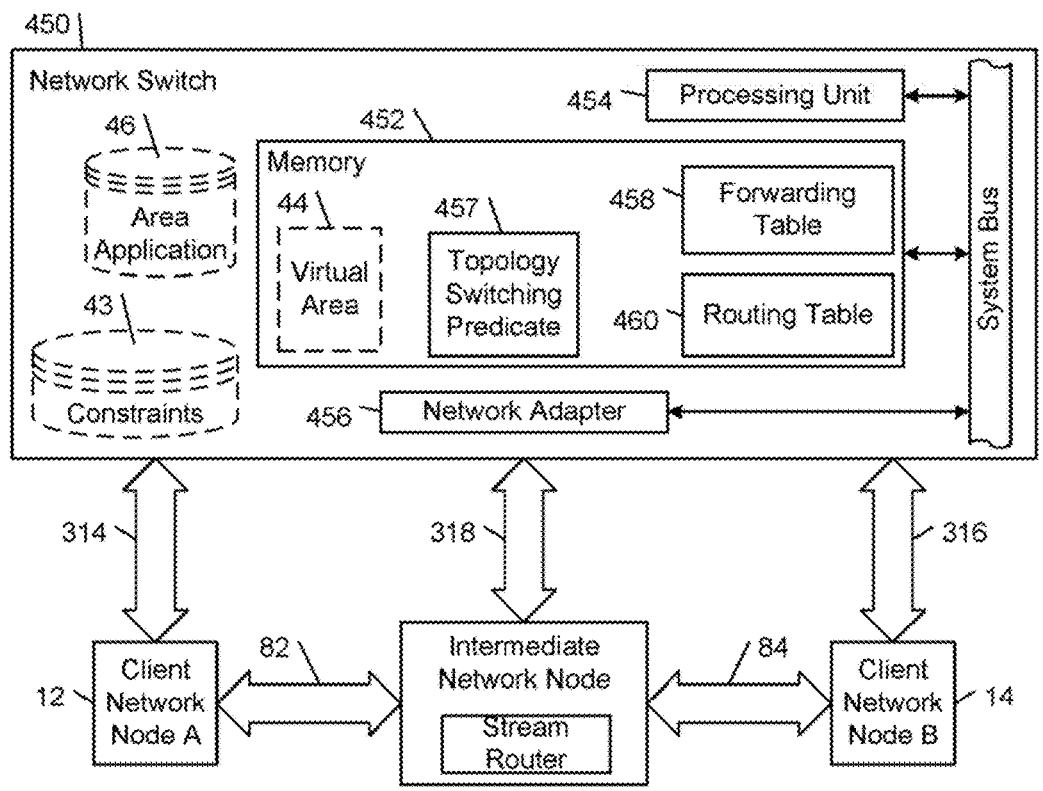
FIG. 18B is a block diagram of an example of a network switch controlling routing of data streams by an intermediate node between a first client network node and a second client network node.

FIG. 18B shows an example of a network switch 450. The network switch 450 is a computer networking device that includes a memory 452, a processing unit 452 that includes at least one computer processor, and a network adapter 456 through which the network switch 450 connects to the client network nodes 12, 14 and the intermediate network node 19. The network switch 450 has a remote controller mode of operation and a switching mode of operation.

In its remote controller mode of operation, the network switch 450 acts as the third network node 312 in controlling routing of data streams by the intermediate node 19 between the first client network node 12 and the second client network node 14, as described above. In some examples, the network switch 450 also may dynamically switch the topology of network connections between the client network nodes 12, 14 from one network topology to another based on one or more topology switching predicates 457 as described above in connection with FIG. 13.

In its switching mode of operation, the network switch 450 also forwards realtime data stream packets between network nodes (e.g., network nodes that are not associated with a virtual area) based at least in part on a routing table comprising network topology information describing routes to network destinations. The network switch 450 connects network segments by inspecting data packets, determining the source of the packets, and forwarding the packets to their respective destinations. The network switch 450 compares the destination and source hardware addresses in each packet to a table of network segments and addresses. If the segments are the same, the packet is dropped; otherwise, the network switch 450 forwards the packet to the proper segment. The network switch 450 typically determines the network destination to which the packet is forwarded based on a forwarding table 458, which contains preferred routes for packet forwarding. The network switch 450 typically generates the forwarding table 458 by applying a routing algorithm to a routing table 460, which contains routes to network destinations in the vicinity of the network switch 450. The routes in the forwarding table 458 and the routing table 460 typically are specified by information describing the network topology between the network switch 450 and the network destinations. The network switch 450 does not forward bad or misaligned packets. The network switch 450 may operate at one or more of the OSI layers, including the physical layer, the data link layer, the network layer, and the transport layer. Exemplary implementations of the network switch 450 include, but are not limited to, network switches, network routers, and network hubs.

In some examples, the network switch 450 also may provide the network infrastructure service environment 42 that manages sessions of the first and second client nodes 12, 14 in one or more virtual areas 44 in accordance with respective virtual area applications 46, as described above and in U.S. Provisional Patent Application No. 61/563,088, filed Nov. 23, 2011. For example, the network switch 450 may have a virtual area based stream switching mode of operation that incorporates one or more of the realtime data stream switching functionalities of the area service, enabling the network switch 450 to perform automated realtime data stream switching between client network nodes in accordance with one or more of the methods described above and in U.S. Pat. Nos. 7,769,806 and 7,844,724.

In the examples of FIGS. 17, 18A, and 18B, the stream routers created by the intermediate network node 19 are specified and configured in accordance with data routing instructions that are received from a remote network node (e.g., a server network node, such as the area server node 40, a client network node, and a network switch).

Figure 19:
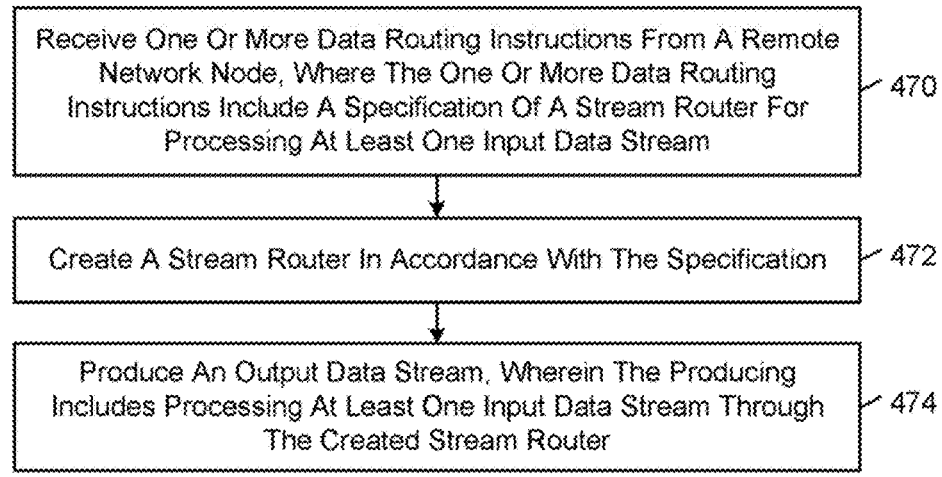
FIG. 19 is a flow diagram of an example of a method of creating a stream router.

FIG. 19 shows an example of a method that is implemented by the intermediate network node 19 in response to data routing instructions that are received from the remote network node.

In accordance with the method of FIG. 19, the intermediate network node 19 receives one or more data routing instructions from the remote network node, where the data routing instructions include a specification of a stream router for processing at least one input data stream (FIG. 19, block 470). The intermediate network node 19 creates a stream router in accordance with the stream router specification (FIG. 19, block 472). The stream router may include a mixing function that is specified in the one or more data routing instructions. The mixing function is used to mix the realtime data stream with at least one other realtime data stream to produce a mixed realtime data stream. The intermediate network node 19 produces an output data stream in a process that includes processing at least one data stream through the created stream router (FIG. 19, block 474). In some embodiments, this process involves determining configuration parameter values from the one or more data routing instructions, and dynamically configuring the stream router with the configuration parameter values.

Figure 20:
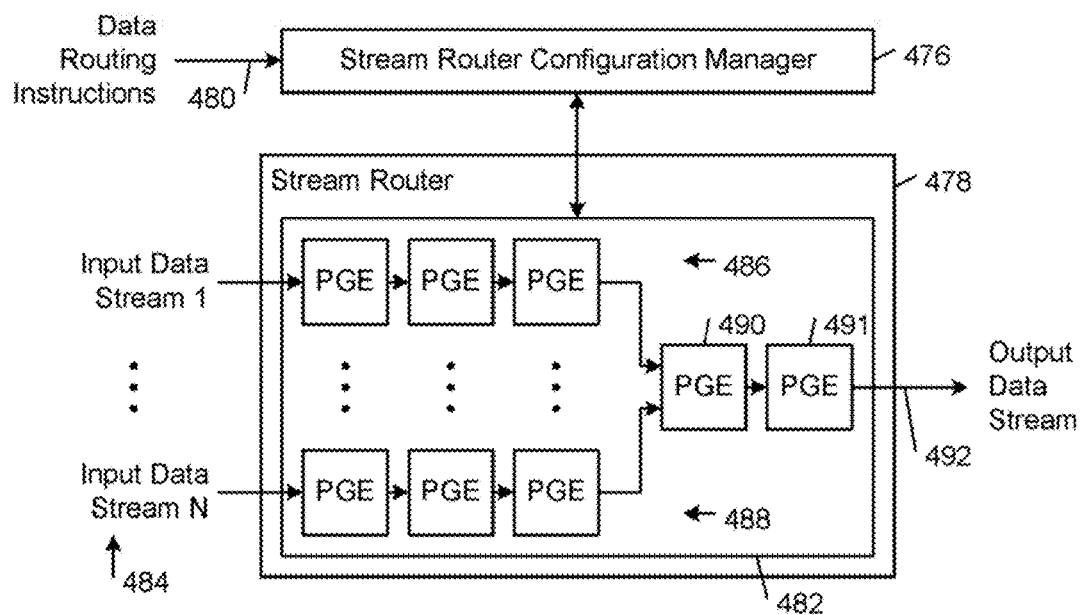
FIG. 20 is a block diagram of an example of a stream router configuration manager creating a stream router.

FIG. 20 is a block diagram of an example of a stream router configuration manager 476 (which is component of the intermediate network node 19) and a stream router 478 that includes one or more data route between a first client network node and a second client network node. The stream router configuration manager 476 creates the stream router 478 in accordance with data routing instructions 480 that are received from the remote network node. The stream router configuration manager 476 typically is composed of one or more constituent services and other components of the intermediate network node 19. The stream router configuration manager 476 constructs the stream router 478 from a set of processing objects (also referred to as processing graph elements, PGEs, or plugins). Each of the processing objects is a software object that is capable of performing a particular function on a data stream (e.g., a transformation function, a splitting function, and a mixing function). The stream router configuration manager 476 instantiates the processing objects that are specified in the one or more data routing instructions and assembles the instantiated processing objects into a directed graph component 482 of the stream router 478 in accordance with the specification. In some embodiments, the data routing instructions specify the processing objects with respective unique identifiers and the stream router configuration manager 476 instantiates the processing objects by issuing calls that include respective ones of the identifiers to a processing object API. The stream router 478 is configured to process multiple data streams 484 of a particular data type (e.g., audio, video, and motion data types) through respective data routes 486, 488 (also referred to as processing chains), which are composed of respective ones of the processing objects. The stream router 478 additionally includes a mixing object 490 (which was specified in the one or more data routing instructions) and an output processing object 491 ("channel consumer"), which produce an output data stream 492 from the mixed combination of the processed data streams 486-488 produced by the mixing object 490. In some examples, at least one of the instantiated processing objects (e.g., the output object 491) encapsulates a respective call to a driver module, which controls a hardware component (e.g., a network interface card) of the intermediate network node 19 based at least in part on the output data stream 492.

In some examples, the intermediate network node 19 includes a routing architecture that includes a set of the components of the client realtime kernel architecture described in U.S. patent application Ser. No. 12/630,973, filed Dec. 4, 2009. The routing architecture supports remote configuration of stream routers for processing data streams that are received by the intermediate network node 19 from other network nodes. In response to instructions that are received from the area service, various services and other components of the routing architecture cooperatively construct and configure directed graphs of processing elements into stream routers that are used to process data streams. The area service instructions configure the stream routers in accordance with a virtual area application being hosted by a virtual area that is managed by the area service. In these examples, the routing architecture includes a collection of services and plugins, which constitute a platform for routing virtual area communications in accordance with instructions received from the area service. Services work together to implement the platform, operating at different levels—from network features through media routing configuration. Plugins are of various classes, each adhering to a Plugin Management API, each with its own class API. The platform is configured in accordance with an instance of a virtual area by area service through SODA definition records transmitted over a STRAW UDP socket, as described in U.S. patent application Ser. No. 12/630,973, filed Dec. 4, 2009, and U.S. patent application Ser. No. 12/825,512, filed Jun. 29, 2010.

Among the managers of the routing architecture are a connection and service mix manager and a plugin manager.

In some examples, the connection and server mix manager is a Windows® service DLL. The connection and server mix manager constructs media graphs from media graph processing elements. The media graph processing elements are configured by the area service, either directly through SODA records or indirectly through VSDL scripts. In any case SODA definitions are the result. In some embodiments, the connection and server mix manager processes the following SODA definitions sent by area service:

MediaStream
MediaMix
MediaEffect
MediaCalculation

These SODA definitions are described in the following paragraphs.

MediaStream is a definition of an incoming media stream to be registered with the media transport bus as a MediaSource. An incoming media stream is defined by the Channel ID it is transported over. The device uses the Channel ID as its media transport bus ID. The connection and server mix manager creates an instance of the appropriate variant of the MediaStream plug-in based on the Channel Type ID, and hands it off to the media transport bus.

MediaMix is a definition of a combination MediaSource and MediaSink plug-in. The definition fully specifies the plug-in API ID, variant ID, and one or two Audio Transport Bus source IDs. The connection and server mix manager creates the indicated variant of the MediaMix plug-in based on the IDs provided, and hands it off to the Audio Transport Bus.

MediaEffect is a definition of a combination MediaSource and MediaSink plug-in. The definition fully specifies the plug-in API ID, variant ID, and one media transport bus Source IDs. The connection and server mix manager creates the indicated variant of the MediaEffect plug-in based on the IDs provided, and hands it off to the media transport bus.

MediaCalculation is a definition of a MediaCalculation plug-in. The definition fully specifies the plug-in API ID, variant ID, associated media transport bus MediaSource object ID, the component's own media transport bus ID, and two situation-specific parameters. The MediaCalculation objects are not processing media data directly in media chains. Instead the MediaCalculation objects calculate settings for other media graph components based on a "domain object model", external information such as manual settings (mute, volume control in the HUD), avatar position and motion, and reverb spaces. MediaCalculation objects are executed on a different rendering timer event—much less often than normal media rendering. This is because the data they use as inputs to calculations change slowly. The connection and server mix manager creates the indicated variant of the MediaCalculation plug-in based on the IDs provided, and hands it off to the media transport bus.

The connection and server mix manager configures the transport bus and the media stream service according to definitions received from the area server. Each definition results in the creation of a media processing graph element, which is a media stream plugin, a media calculation plugin, or a media source plugin.

The connection and server mix manager configures the transport bus and the media stream service according to definitions received from the area server. Each definition results in the creation of a media processing graph element, which is a media stream plugin, a media calculation plugin, or a media source plugin. The area service adjusts the media stream service mix parameters according to zone definitions and avatar position definitions. The area service publishes to the area service SODA definitions that relate each avatar to the media processing graph element that responds to that avatar's motion. The avatar position data is used to mix the media streams from each of the client network nodes participating in a virtual area in a way that allows each communicant to hear the other communicants at the right media location with the right volume according to local zone definitions. The parameter values that are applied to the media processing graph elements typically depend upon a calculation that includes relative position, orientation of communicants, zone definitions, media properties of the virtual area, and manual settings (e.g., mute, volume) that are configured by the communicant. Some calculations are appropriate for individual media sources; some for whole-room final mix. The virtual area application can introduce new plugins at will by referring to them in media definitions. The area service will subscribe to plugins that it doesn't have, and receive their definition from the area server.

Details of the structure and operation of the plugin manger are described in in U.S. patent application Ser. No. 12/630,973, filed Dec. 4, 2009 (see, e.g., § V.8).

Among the services of the routing architecture are a STRAW service, a SODA handler service, an audio stream service, and a transport bus service. Details of the structure and operation of the SODA handler service, the audio stream service, and the transport bus service are described in U.S. patent application Ser. No. 12/630,973, filed Dec. 4, 2009 (see, e.g., § V.6).

The routing architecture additionally includes a media transport bus, which is a component of the transport bus that handles media streams. In some embodiments, the media transport bus is implemented by a library that manages a media graph as a collection of component objects. Each of the media graph objects is registered with the media transport bus using a unique ID. The media transport bus is responsible for managing the media graph objects when rendering media. The media transport bus traces the media graph components by ID. In this process, the media transport bus invokes each media graph component in turn, providing the media data from the input component named by ID.

The media transport bus buffers one time-interval of each media stream available on the client network node. The media transport bus feeds these streams to zero or more subscribers as configured by the media stream service 272. Streaming data uses a pull model, where the final output stage calls preceding stages for data as needed. Each stage calls the one before until the original media stream source is reached. If the source needs to control rate (flow control) it typically does its own buffering and has its own particular signaling scheme. For instance a local file source can double-buffer and read ahead one time-interval while processing the preceding one. A network file source can signal flow rates and buffer limits over the network to the server. A local microphone source, on the other hand, has no ability to control flow rate at all.

The media transport bus operates in two phases: upon a rendering timer event, it provides existing rendered data to MediaSink components; the media transport bus then traverses the media graph, causing the next time-slice worth of media data to be rendered and buffered. This technique gives the media graph a good chance of providing continuous playback, even in the presence of variable-latency media source data.

In some embodiments, the media transport bus measures the rendering latency of each media graph component, and aggregates the rendering chain latencies by adding up all dependent (source) media component latencies. The media transport bus collects and registers the rendering latency statistics. Based on these statistics, a realtime scheduler determines when and how the media graph should be modified in order to achieve a media graph processing target. In some embodiments, the realtime scheduler executes one or more of the methods described U.S. patent application Ser. No. 12/630,973, filed Dec. 4, 2009 (see, e.g., FIGS. 13 and 14) in the process of determining when and how the directed graph should be modified in order to achieve a particular processing target.

Another function of the media transport bus is to invoke MediaCalculation objects periodically. The MediaCalculation objects are used to change settings of associated ones of the media graph processing elements. The period of MediaCalculation execution typically is much longer (less often) than the media graph rendering period.

The media transport bus typically has the ability to record streams and replay recorded streams. The raw media streams typically are recorded so that during playback the mix can be re-rendered according to the viewer's point of view. Some embodiments include a hub that receives all of the raw media streams. In these embodiments, the hub typically handles the recording of sessions. When it is not desirable to re-render a session, the media transport bus typically only records media streams at the client network node.

The MediaSource object is the base for all media sources. This object delivers data when polled, and defines its desired latency and channels (e.g., mono, stereo, 5.1). Derived objects include Microphone, MediaStream, Clip, WaveFile, DirectX audio, and the output side of the Mix plugins.

The MediaSink object is the base object for media output devices. This object requests data from a MediaSource when polled. Derived objects include Speaker, MediaStream and the input side of the Mix plugins.

Figure 21:
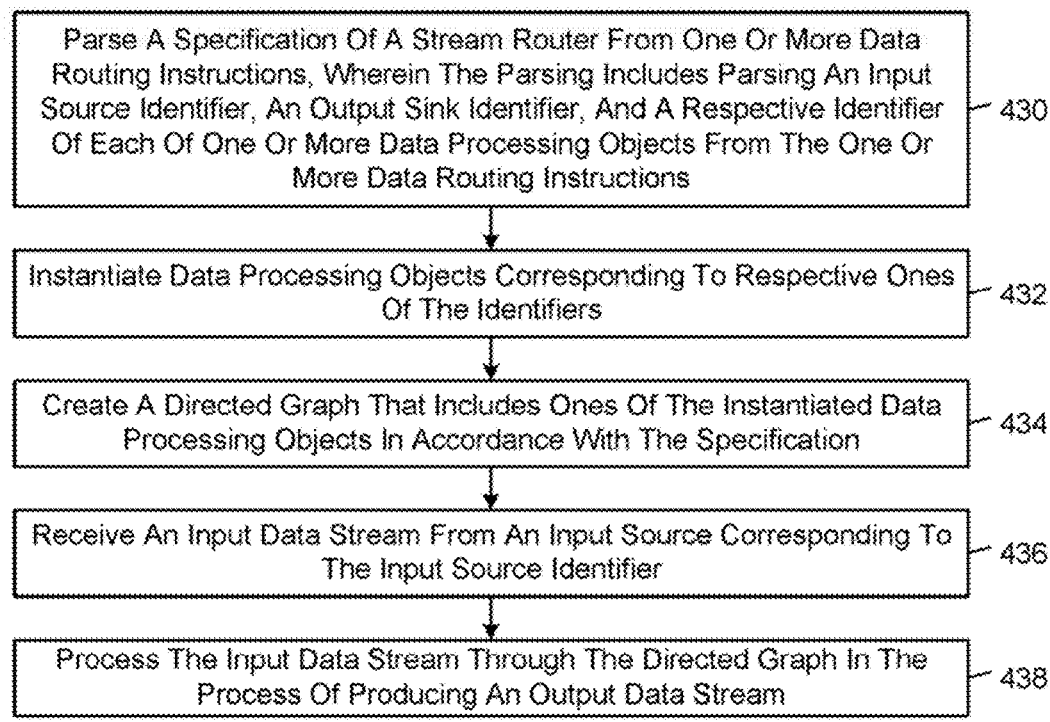
FIG. 21 is a flow diagram of an example of a stream routing method.

FIG. 21 shows an embodiment of a method that is implemented by components of the routing architecture in response to remote data routing instructions that are received from the area service. In accordance with this method, the routing architecture parses a specification of a stream router from one or more data routing instructions (FIG. 21, block 430). In this process, the STRAW service receives SODA definitions for configuring a stream router from the area service. The STRAW service dispatches the SODA definitions to the connection and server mix manager. The connection and server mix manager parses an input source identifier, an output sink identifier, and a respective identifier of each of one or more data processing objects from the one or more data routing instructions. The connection and server mix manager instantiates data processing objects corresponding to respective ones of the identifiers (FIG. 21, block 430). The connection and server mix manager registers the instantiated objects with the transport bus. The transport bus creates a directed graph that includes ones of the instantiated realtime data processing objects in accordance with the specification (FIG. 21, block 430). The area service operating on the server node 40 passes media calculation SODA definitions to specified media calculation objects in the directed graph. The STRAW service receives an input data stream from an input source corresponding to the input source identifier (FIG. 21, block 430). The STRAW service passes the input data stream to the media service, which processes the stream and passes it to the transport bus. The transport bus executes the processing graph elements of the stream router in sequence to perform the specified processing of the realtime data stream. The stream handler produces an output data stream at an output sink corresponding to the output sink identifier (FIG. 21, block 430). The output data stream then is passed to network components of the intermediate network node 19.

Figure 22:
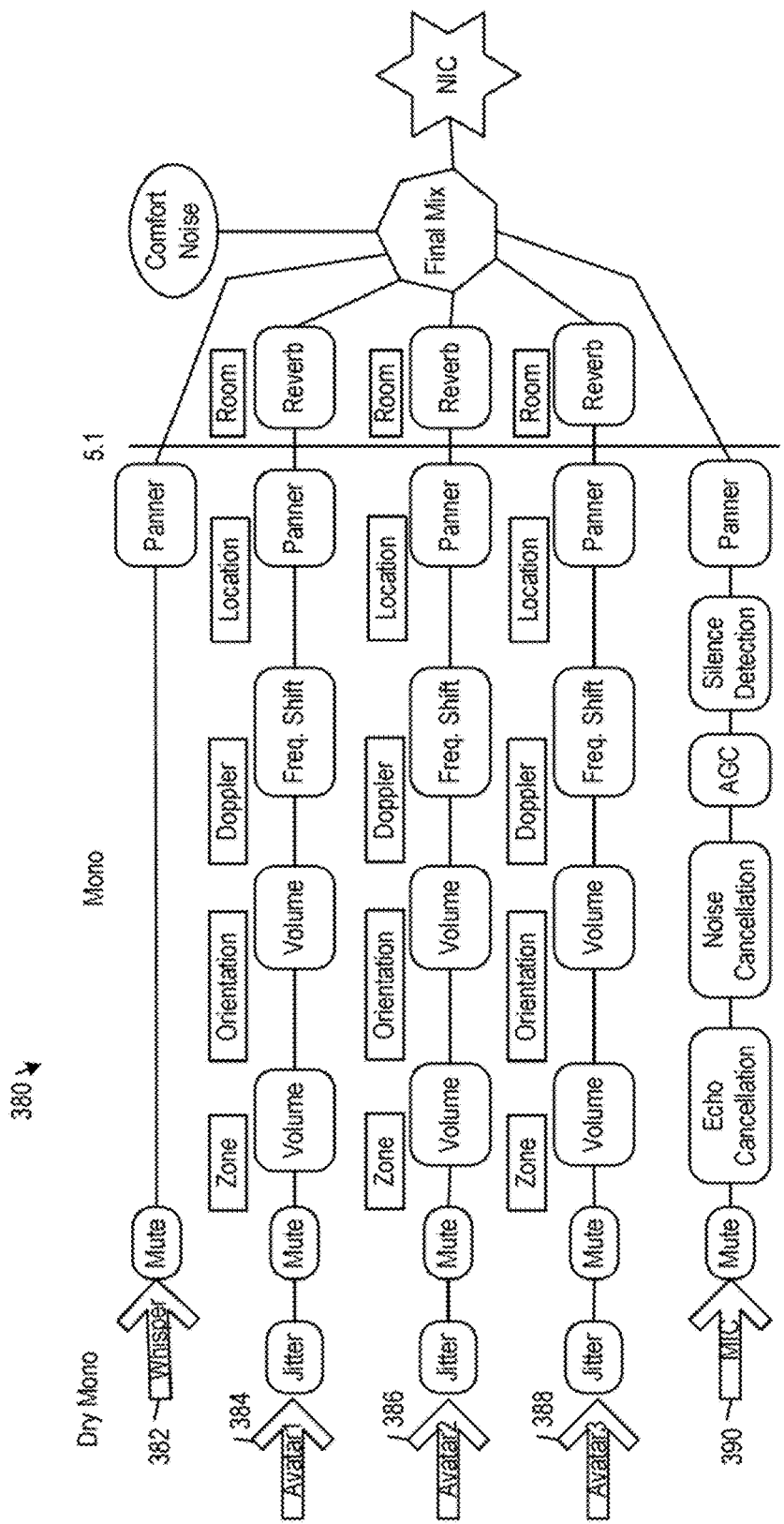
FIG. 22 is a diagrammatic view of an example of an audio stream router.

FIG. 22 shows an example of a four-communicant audio processing graph 380, which might be created by the intermediate network node 19 in accordance with routing instructions received from the area service. In this example, the intermediate network node 19 not only is routing the input data streams received from three of the four client network nodes as a single mixed data stream to the fourth client network node, but also is incorporating effects processing on the input data streams so as to reducing the computation and memory resources required by the fourth network node to achieve an immersive communication experience in the virtual area. Certain audio processing graph elements (e.g., codecs, the network, filtering, special effects, and error concealment graph elements), which typically are present in a complete audio processing graph, have been left out of this example for illustrative purposes only.

The arrows 382, 384, 386, 388, 390 represent MediaSources, which are all dry mono audio sources. Avatars 1, 2 and 3 are network streams from remote client network nodes. Whisper is an optional local audio feed from a designated source. Everything to the left of the audio Panners is mono with a series of effects added. These effects include adjusting volume according to Zone and speaker Orientation and applying a Doppler shift to account for relative velocity of speaker and listener. The audio Panners position each adjusted mono signal in the three hundred sixty degree audio space of the currently occupied zone of a virtual area. The Location of the speaker relative to the listener is used. Everything to the right of an audio Panner is 5.1 audio. The Room audio processing graph element calculates the effect of the room acoustics on the audio signal. It takes into account position of speaker and listener, room characteristics, and obstructions. The Final Mix audio processing graph element adds all of the processed audio signals together to produce a resultant stream that is piped to the designated audio output device (i.e., NIC, which represents the local network adapter in the illustrated example).

Some audio processing graph elements (inserts) have fixed parameters and, therefore, are not associated with any runtime calculation plugin scripts. These elements include echo and noise cancellation, automatic gain control (AGC), silence detection, fixed-source Panner, and Final Mix.

Other embodiments are within the scope of the claims.

The invention claimed is:

1. A method of routing data streams between client network nodes in connection with a virtual area that supports establishment of communicant presence, the method comprising, by a computer system:
routing one or more data streams of a first data stream type over a first type of network connection between client network nodes of users who are copresent in the virtual area;
responsive to an event that satisfies a switching predicate, ascertaining a second type of network connection between client network nodes of users who are copresent in the virtual area, wherein the first and second types of network connection are different, and the switching predicate is based on one or more of a count of client network nodes of users who are copresent in the virtual area, one or more types of data streams being communicated between client network nodes of the copresent users, bandwidth capabilities of client network nodes of the copresent users, attributes of the virtual area, and network latencies experienced by client network nodes of the copresent users;
responsive to a determination that a network connection of the second type currently exists, routing one or more data streams of the first data stream type over the second type of network connection between client network nodes of users who are copresent in the virtual area, and tearing down the one or more corresponding network connections of the first type; and
responsive to a determination that the second type of network connection currently does not exist, establishing one or more network connections of the second type, and routing one or more data streams of the first data stream type over the established second type of network connection between client network nodes of users who are copresent in the virtual area.

2. The method of claim 1, wherein the virtual area is associated with a first switching rule that defines a first communication property of the virtual area in terms of connections of sources to sinks of the first data stream type between ones of the client network nodes of users who are copresent in the virtual area.

3. The method of claim 1, wherein satisfaction of the switching predicate is based on a count of client network nodes of the copresent users who are communicating streams of the first data stream type in the virtual area exceeding a threshold number.

4. The method of claim 1, wherein satisfaction of the switching predicate is based on respective bandwidth capabilities of client network nodes of the copresent users who are communicating streams of the first data stream type in the virtual area.

5. The method of claim 1, wherein satisfaction of the switching predicate is based on respective current network latencies experienced by the client network nodes of the copresent users who are communicating streams of the first data stream type in the virtual area.

6. The method of claim 1, wherein satisfaction of the switching predicate is based on respective packet losses experienced by the client network nodes of the copresent users who are communicating streams of the first data stream type in the virtual area.

7. The method of claim 1, wherein satisfaction of the switching predicate is based on attribute values associated with positions in the virtual area in which the users are copresent.

8. The method of claim 1, wherein the first data stream type is audio data.

9. The method of claim 8, further comprising routing one or more data streams of the second data stream type, wherein the second data stream type is video data.

10. The method of claim 1, further comprising, after the establishing, reconfiguring one or more network connections of the first type as one or more standby routes between the client network nodes of users who are copresent in the virtual area.

11. The method of claim 1, wherein the first type of network connection corresponds to a peer-to-peer connection between client network nodes of users who are copresent in the virtual area, and the second type of network connection corresponds to connections between client network nodes of users who are copresent in the virtual area that are mediated at least in part by a server network node.

12. The method of claim 1, wherein: before the event, one or more data streams of a second data stream type are routed over the second type of network connection between client network nodes of users who are copresent in the virtual area.

13. The method of claim 1, wherein: after the event, one or more data streams of a second data stream type are routed over the second type of network connection.

14. The method of claim 1, wherein the first type of network connection is peer-to-peer and the second type of network connection is mediated at least in part by a server network node.

15. The method of claim 1, further comprising, after routing the one or more data streams of the first data stream type over the first type of network connection, tearing down corresponding network connections of the first type.

16. A system for routing data streams between client network nodes in connection with a virtual area associated with a switching rule that defines connections of sources to sinks of a particular data stream type between ones of the client network nodes of users who are copresent in the virtual area, the system comprising
at least one memory storing processor-readable instructions, and
at least one processor, operable to execute the instructions, and based at least in part on the execution of the instructions operable to perform operations comprising:
routing one or more data streams of a first data stream type over a first type of network connection between the client network nodes of users who are copresent in the virtual area;
based on an event that satisfies a topology switching predicate, configuring one or more network connections of a second type between the client network nodes of users who are copresent in the virtual area, wherein the first and second types of network connection are different;
based on a determination that one or more connections of the second type currently exist, administering transmission of one or more data streams of the first data stream type over the second type of network connection between client network nodes of users who are copresent in the virtual area, and tearing down the one or more corresponding connections of the first type; and
based on a determination that one or more connections of the second type currently do not exist, configuring the one or more connections of the second type, and administering transmission of one or more data streams of the first data stream type over the established second type of network connection between client network nodes of users who are copresent in the virtual area.

17. The system of claim 16, wherein satisfaction of the switching predicate comprises a count of client network nodes of the copresent users who are communicating streams of the first data stream type in the virtual area exceeding a threshold number.

18. A computer program product for execution by a computer system and comprising at least one non-transitory computer-readable medium having computer-readable program code portions embodied therein, the computer-readable program code portions comprising:
an executable code portion configured to route one or more data streams of a first data stream type over a first type of network connection between client network nodes of users who are copresent in the virtual area;
an executable code portion configured to determine, based on an event that satisfies a switching predicate, one or more network connections of a second type between client network nodes of users who are copresent in the virtual area, wherein the first and second types of network connection are different;
an executable code portion configured, based on a determination that one or more connections of the second type currently exist, to route one or more data streams of the first data stream type over the second type of network connection between the client network nodes of users who are copresent in the virtual area, and further to tear down the one or more corresponding connections of the first type;
an executable code portion configured to establish, based on a determination that one or more connections of the second type currently do not exist, the one or more connections of the second type, and administer transmission of one or more data streams of the first data stream type over the established second type of network connection between client network nodes of users who are copresent in the virtual area.

19. The computer program product of claim 18, wherein satisfaction of the switching predicate comprises a count of client network nodes of the copresent users who are communicating streams of the first data stream type in the virtual area exceeding a threshold number.

* * * * *